United States Patent
Siddiq et al.

(10) Patent No.: US 11,843,834 B2
(45) Date of Patent: Dec. 12, 2023

(54) SYSTEMS AND METHODS FOR PROVIDING RECOMMENDATIONS BASED ON SHORT-MEDIA VIEWING PROFILE AND LONG-MEDIA VIEWING PROFILE

(71) Applicant: Rovi Guides, Inc., San Jose, CA (US)

(72) Inventors: Abubakkar Siddiq, Methuen, MA (US); Vineet Agarwal, Andover, MA (US); Abhijit Satchidanand Savarkar, Andover, MA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 18/116,221

(22) Filed: Mar. 1, 2023

(65) Prior Publication Data

US 2023/0209138 A1 Jun. 29, 2023

Related U.S. Application Data

(63) Continuation of application No. 18/093,619, filed on Jan. 5, 2023, which is a continuation of application
(Continued)

(51) Int. Cl.
*H04N 21/466* (2011.01)
*H04N 21/45* (2011.01)
(Continued)

(52) U.S. Cl.
CPC ..... *H04N 21/4667* (2013.01); *G06Q 30/0271* (2013.01); *H04N 21/252* (2013.01);
(Continued)

(58) Field of Classification Search
CPC .................................................. H04N 21/4667
See application file for complete search history.

(56) References Cited

U.S. PATENT DOCUMENTS 6,202,062 B1  3/2001  Cameron et al.
6,239,794 B1  5/2001  Yuen et al.
(Continued)

FOREIGN PATENT DOCUMENTS

EP   2075989 A1   7/2009
JP   2006229707 A  8/2006
(Continued)

OTHER PUBLICATIONS

Adomavicius, Gediminas et al: "Context-Aware Recommender Systems", Oct. 5, 2010, Springer, XP093028805, ISBN: 978-0-387-85820-3 pp. 217-253, DOI:10.1007/978-0-387-85820-3_7.
(Continued)

*Primary Examiner* — Michael H Hong
(74) *Attorney, Agent, or Firm* — HALEY GUILIANO LLP

(57) ABSTRACT

Systems and methods are provided herein for providing recommendations to a user. A short-media viewing profile may be maintained for the user. The short-media viewing profile may be based on user's behavior while watching short-length media content. A long-media viewing profile may be maintained for the user. The long-media viewing profile may be based on user's behavior while watching long-length media content. In response to determining that the user is currently engaged in viewing short-length media content, a recommendation is provided to the user based on the short-media viewing profile. In response to determining that the user is currently engaged in viewing long-length media content, a recommendation is provided to the user based on the long-media viewing profile.

18 Claims, 11 Drawing Sheets

Related U.S. Application Data

No. 17/674,699, filed on Feb. 17, 2022, now Pat. No. 11,582,520, which is a continuation of application No. 17/171,095, filed on Feb. 9, 2021, now Pat. No. 11,284,154, which is a continuation of application No. 16/543,924, filed on Aug. 19, 2019, now Pat. No. 10,951,949, which is a continuation of application No. 15/815,291, filed on Nov. 16, 2017, now Pat. No. 10,433,015.

(51) Int. Cl.

| | |
|---|---|
| *H04N 21/81* | (2011.01) |
| *H04N 21/482* | (2011.01) |
| *H04N 21/458* | (2011.01) |
| *H04N 21/2668* | (2011.01) |
| *G06Q 30/0251* | (2023.01) |
| *H04N 21/431* | (2011.01) |
| *H04N 21/258* | (2011.01) |
| *H04N 21/25* | (2011.01) |
| *H04N 21/442* | (2011.01) |

(52) U.S. Cl.
CPC ... *H04N 21/25891* (2013.01); *H04N 21/2668* (2013.01); *H04N 21/4316* (2013.01); *H04N 21/44222* (2013.01); *H04N 21/44226* (2020.08); *H04N 21/458* (2013.01); *H04N 21/4532* (2013.01); *H04N 21/4668* (2013.01); *H04N 21/4826* (2013.01); *H04N 21/812* (2013.01)

(56) References Cited

U.S. PATENT DOCUMENTS

| | | |
|---|---|---|
| 6,564,378 B1 | 5/2003 | Satterfield et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,442,863 B2 | 5/2013 | Chandramouli et al. |
| 8,762,859 B2 * | 6/2014 | Macadaan ............. H04L 67/535 |
| | | 715/811 |
| 9,734,453 B2 | 8/2017 | Kegel et al. |
| 11,284,154 B2 | 3/2022 | Siddiq et al. |
| 11,582,520 B2 | 2/2023 | Siddiq et al. |
| 2002/0174430 A1 | 11/2002 | Ellis et al. |
| 2005/0251827 A1 | 11/2005 | Ellis et al. |
| 2007/0061195 A1 | 3/2007 | Liu et al. |
| 2007/0089136 A1 | 4/2007 | Kumai et al. |
| 2008/0209343 A1 | 8/2008 | Macadaan et al. |
| 2010/0153885 A1 | 6/2010 | Yates |
| 2015/0113570 A1 | 4/2015 | Klarfeld et al. |
| 2016/0192005 A1 * | 6/2016 | Larson ............... H04N 21/4667 |
| | | 725/10 |
| 2017/0068847 A1 | 3/2017 | El Kaliouby et al. |
| 2017/0099512 A1 | 4/2017 | Osminer |
| 2018/0007409 A1 * | 1/2018 | Xie .................. H04N 21/44204 |
| 2018/0184240 A1 | 6/2018 | Yang et al. |
| 2021/0168453 A1 | 6/2021 | Siddiq et al. |
| 2022/0394339 A1 | 12/2022 | Siddiq et al. |

FOREIGN PATENT DOCUMENTS

| | | |
|---|---|---|
| JP | 2007110610 A | 4/2007 |
| JP | 2016177607 A | 10/2016 |
| JP | 2017167909 A | 9/2017 |
| WO | 2017005054 A1 | 1/2017 |

OTHER PUBLICATIONS

International Search Report and Written Opinion dated Jan. 23, 2019 for Application No. PCT/US2018/060599 (17 pages).

Baltrunas et al., "Context-Based Splitting of Item Ratings in Collaborative Filtering," Proceedings of the third ACM conference on Recommender Systems (http://www.inf.unibz.it/~ricci/papers/p245-baltrunas.pdf) (Oct. 2009).

* cited by examiner

SYSTEMS AND METHODS FOR PROVIDING RECOMMENDATIONS BASED ON SHORT-MEDIA VIEWING PROFILE AND LONG-MEDIA VIEWING PROFILE

CROSS-REFERENCE TO RELATED APPLICATIONS

This application is a continuation of U.S. patent application Ser. No. 18/093,619 filed Jan. 5, 2023, which is a continuation of U.S. patent application Ser. No. 17/674,699, filed Feb. 17, 2022, (now U.S. Pat. No. 11,582,520), which is a continuation of U.S. patent application Ser. No. 17/171,095, filed Feb. 9, 2021, (now U.S. Pat. No. 11,284,154), which is a continuation of U.S. patent application Ser. No. 16/543,924, filed Aug. 19, 2019, (now U.S. Pat. No. 10,951,949), which is a continuation of U.S. patent application Ser. No. 15/815,291, filed Nov. 16, 2017, (now U.S. Pat. No. 10,433,015), the disclosures of each application are incorporated by reference in their entireties.

BACKGROUND

A typical television system may provide recommendations or advertisements to a user based on a maintained user profile. Typically, only a single user profile is maintained for each user. At best, multiple profiles may be maintained based on the user's location. However, such profiles fail to account for current watching behavior of the user. In particular, a user who is currently watching long-length media content (e.g., full-feature movies) is usually, at that time, receptive to very different types of recommendations or advertisements than a user who is engaged in watching short-length media content (e.g., video clips, user-created short video such as YouTube videos or news videos). Consequently, current systems often provide inefficient recommendations or advertisements that fail to match current preferences of the user.

SUMMARY

To this end and others, in some embodiments, a media guidance application may separately track a user's behavior during a time period when the user consumes short-length media and a time period when the user consumes long-length media. Specifically, two different user profiles (short-media viewing profile and long-media viewing profile) are maintained, each profile tracking a user's behavior during the respective time periods. Later, when the user consumes media content, the length of that content is compared to a threshold. If the media content is sufficiently long, the long-media viewing profile is activated. Otherwise, the short-media viewing profile is activated. Consequently, recommendations or advertisements may be provided to the user based on which profile is currently active. Because users often have different preferences when watching media content of different lengths, such utilization of two profiles improves the quality and relevance of the recommendations and advertisements. In particular, the operation of the media guidance application is improved, because provided recommendations and advertisements are better suited to the current watching activity of the user.

The media guidance application may provide recommendations to a user in accordance with some embodiments of the disclosure. In some embodiments, the media guidance application may maintain a short-media viewing profile for the user. For example, the media guidance application may store user's behavior during time periods when the user is watching short-length media content (e.g., YouTube video, film clips, news stories, etc.) The stored user behavior may include requesting other content (e.g., media content, or web pages), interacting with advertisements, making phone calls, sending text messages, any other requests, or any combination thereof.

In some embodiments, the media guidance application may maintain a long-media viewing profile for the user. For example, the media guidance application may store the user's behavior during time periods when the user is watching long-length media content (e.g., full-feature movies, long TV series episodes, etc.) The stored user behavior may include requesting other content (e.g., media content, or web pages), interacting with advertisements, making phone calls, sending text messages, any other requests, or any combination thereof.

In some embodiments, the media guidance application may, in response to determining that the user is currently engaged in viewing short media, provide a recommendation to the user based on the short-media viewing profile. For example, if the user is engaged in watching short-length media content (e.g., YouTube videos, film clips, news stores, etc.), the media guidance application may identify a recommendation that matches information stored in the short-media viewing profile. In some embodiments, if the short-media viewing profile includes data that the user has, in the past, positively reacted to a pizza advertisements when watching short media, the media guidance application may present a pizza offer to the user. In some embodiments, the media guidance application may provide a recommendation to view second short-length media content.

In some embodiments, the media guidance application may, in response to determining that the user is currently engaged in viewing long media, provide a recommendation to the user based on the long-media viewing profile. For example, if the user is engaged in watching long-length media content (e.g., full feature movie, or a full TV series episode), the media guidance application may identify a recommendation that matches information stored in the long-media viewing profile. For example, if the long-media viewing profile includes data that the user has, in the past, positively reacted to a car advertisement when watching long media, the media guidance application may present a car lease offer to the user. In some embodiments, the media guidance application may provide a recommendation to view second long-length media content.

The media guidance application may provide recommendations to a user in accordance with some embodiments of the disclosure. In some embodiments, the media guidance application may track behavior of the user while that user is engaged in watching short-length media content. For example, the media guidance application may track the user's behavior during the time when the user is watching short-length media content (e.g., YouTube videos, film clips, news stories). For example, tracked user behavior may include one or more of: requests for content or data made by the user, the user's interaction with any advertisements, any phone calls made by the user, and any websites visited by the user.

In some embodiments, the media guidance application may generate a short-media viewing profile based on the user's behavior tracked when the user was engaged in watching short-length media content. In some embodiments, the short-media viewing profile may comprise a plurality of recommendation metadata. For example, the media guidance application may generate or update a short-media viewing profile to store recommendation metadata related to actions performed by the user. In some embodiments, if the user requested any kind of content during watching short-length media content, metadata associated with that content may be stored by the media guidance application as recommendation metadata. For example, if a user has requested a video, the media guidance application may store at least one of the title, the genre, and an actor's name as recommendation metadata. In another example, if the user clicked on a provided advertisement, the media guidance application may store metadata associated with that advertisement as recommendation metadata. For example, at least one of the company name, the product name, and the title of the advertisement may be stored by the media guidance application as recommendation metadata. In yet another example, if the user has visited a website, the media guidance application may store at least one of the website URL and keywords associated with that website as recommendation metadata.

In some embodiments, the media guidance application may track behavior of the user while the user is engaged in watching long-length media content. For example, the media guidance application may track the user's behavior during the time when that user is watching long-length media content (e.g., full-feature movie, or full TV show episode). For example, tracked user behavior may include one or more of: requests for content or data made by the user, the user's interaction with any advertisements, any phone calls made by the user, and any websites visited by the user.

In some embodiments, the media guidance application may generate a long-media viewing profile based on the user's behavior tracked when the user was engaged in watching long-length media content. In some embodiments, the long-media viewing profile may comprise a plurality of recommendation metadata. For example, the media guidance application may generate or update a long-media viewing profile to store recommendation metadata related to actions performed by the user. In some embodiments, if the user requested any kind of content during watching long-length media content, metadata associated with that content may be stored by the media guidance application as recommendation metadata. For example, if a user has requested a video, the media guidance application may store at least one of the title, the genre, and an actor's name as recommendation metadata. In another example, if the user clicked on a provided advertisement, the media guidance application may store metadata associated with that advertisement as recommendation metadata. For example, at least one of the company name, the product name, and the title of the advertisement may be stored by the media guidance application as recommendation metadata. In yet another example, if the user has visited a website, the media guidance application may store at least one of the website URL and keywords associated with that website as recommendation metadata.

In some embodiments, the media guidance application may provide media content to the user. In some embodiments, the media content may be provided to the user's device. For example, the media guidance application may provide a movie or TV show for display on the user's TV or computer screen. In another example, the media guidance application may provide media content to any kind of media content reproduction device.

In some embodiments, the media guidance application may then compare the length of the media content to a length threshold. For example, the length threshold may be set at 15 minutes. That is, any media content shorter than 15 minutes may be considered short-length media content, while any media content that is equal to or longer than 15 minutes may be considered long-length media content. In some embodiments, any other time value may be used as a length threshold. In some embodiments, the length threshold may be dynamically adjusted by the media guidance application.

In some embodiments, the media guidance application may then, in response to determining that the length of the media content corresponds to (e.g., exceeds) the length threshold, activate the long-media viewing profile. In some embodiments, the activated profile may be used for any action that needs data from the user profile. In some embodiments, only the currently activated profile is updated based on further behavior of the user. In some embodiments, the activated profile may be used to provide recommendations to the user. In some embodiments, the media guidance application may select a recommendation item, wherein the metadata of the recommendation item matches at least one recommendation metadata of the long-media viewing profile (i.e., the currently activated profile).

In some embodiments, the media guidance application may access a database of available recommendation items. Each recommendation item may be associated with the recommended content and include metadata associated with the recommended content. In some embodiments, recommendation item may be associated with an advertisement and include metadata associated with that advertisement. For example, if a recommendation item is associated with a Ford car commercial, the recommendation item may include metadata such as title of the advertisement (e.g., "Ford Car Commercial no. 78"), general advertising space (e.g., "Car Commercials"), keywords (e.g., "car," "automobile," "Ford"), or any other metadata. In some embodiments, a recommendation item may be associated with media content and include metadata associated with that media content. For example, if a recommendation item is associated with the movie "Good Will Hunting," the recommendation item may include metadata such as: Title (e.g., "Good Will Hunting"), genre (e.g., "Drama," or "Comedy"), actors (e.g., "Matt Damon"), length (e.g., 126 minutes).

In some embodiments, the media guidance application may compare the metadata contained in the recommendation item to recommendation metadata contained in the long-media viewing profile (i.e., the currently activated profile). If the comparison indicates a sufficient match between the metadata, the media guidance application may select that recommendation item for presentation to the user. In some embodiments, the media guidance application may then provide the recommendation item to the user device. For example, the recommendation item may be provided to the same device that is used to provide the media content. In some embodiments, the recommendation item may be provided to a different device belonging to the user (e.g. the user's phone or computer).

In some embodiments, the media guidance application may, in response to determining that the length of the media content does not correspond to (e.g., exceeds) the length threshold, activate the short-media viewing profile. In some embodiments, the activated profile may be used to provide recommendations to the user. In some embodiments, the media guidance application may select a recommendation item, wherein the metadata of the recommendation item matches at least one recommendation metadata of the short-media viewing profile (i.e., the currently activated profile).

In some embodiments, the media guidance application may access a database of available recommendation items. Each recommendation item may be associated with recommended content and include metadata associated with the recommended content. In some embodiments, the media guidance application may compare the metadata contained in the recommendation item to recommendation metadata contained in the short-media viewing profile (i.e., the currently activated profile). For example, if a recommendation item is associated with a Domino's Pizza commercial, the recommendation item may include metadata such as title of the advertisement (e.g., "Domino's Pizza commercial no. 78"), general advertising space (e.g., "Pizza Commercials"), keywords (e.g., "pizza," "takeout," "Domino's"), or any other metadata. In some embodiments, the recommendation item may be associated with media content and include metadata associated with that media content. For example, if a recommendation item is associated with the music video "Thriller," the recommendation item may include metadata such as: Title (e.g., "Thriller"), genre (e.g., "Music Videos"), performer (e.g., "Michael Jackson"), length (e.g., 14 minutes).

If the comparison indicates a sufficient match between the metadata, the media guidance application may select that recommendation item for presentation to the user. In some embodiments, the media guidance application may then provide the recommendation item to the user device. For example, the recommendation item may be provided to the same device that is used to provide the media content. In some embodiments, the recommendation item may be provided to a different device belonging to the user (e.g. the user's phone or computer).

In some embodiments, the media guidance application may generate a short-media viewing profile using the following sequence of steps. In some embodiments, the media guidance application may determine that the user is watching short-length media content. For example, the media guidance application may determine that the length of the currently provided media content does not exceed the length threshold (e.g., 15 minutes). The media guidance application may then monitor user requests for content during or immediately after (e.g., within 1 minute) the time when the short-length media content is played. For example, the media guidance application may monitor the user's device and any other device associated with the user for content requests. In some embodiments, content requests may be requests for other media content, requests for web pages, requests for data from mobile applications, or any combination thereof. In some embodiments, the media guidance application may then store the metadata associated with the user requests. For example, if the user requested a video during or immediately after the time when the short-length media content is played, the media guidance application may store any metadata associated with that video in the short-media viewing profile.

In some embodiments, the media guidance application may generate a short-media viewing profile using the following sequence of steps. In some embodiments, the media guidance application may determine that the user is watching short-length media content. For example, the media guidance application may determine that the length of the currently provided media content does not exceed the length threshold (e.g., 15 minutes). The media guidance application may then provide an advertisement to the user device during or immediately after the time when the short-length media content is played. For example, the media guidance application may provide an advertisement on the same device used to provide the media content or any other device associated with the user. For example, the media guidance application may provide an advertisement to the user's TV, telephone, or any other user device.

In some embodiments, the media guidance application may then monitor the user's response to the advertisement. For example, the media guidance application may monitor whether the user has interacted with the advertisement in any way. In some embodiments, any detected user interaction (e.g., a click) with the advertisement may be interpreted as favorable response. In some embodiments, the media guidance application may, in response to determining that the user's response was favorable, store metadata associated with the advertisement. For example, if a user clicked on a pizza offer advertisement, the media guidance application may store the keyword "pizza" in the short-media viewing profile.

In some embodiments, the media guidance application may generate a long-media viewing profile using the following sequence of steps. In some embodiments, the media guidance application may determine that the user is watching long-length media content. For example, the media guidance application may determine that the length of the currently provided media content exceeds the length threshold (e.g., 15 minutes). The media guidance application may then monitor user requests for content during or immediately after (e.g., within 1 minute) the time when the long-length media content is provided. For example, the media guidance application may monitor the user's device and any other device associated with the user for content requests. In some embodiments, content requests may be requests for other media content, requests for web pages, requests for data from mobile applications, or any combination thereof. In some embodiments, the media guidance application may then store the metadata associated with the user requests. For example, if the user requested a video during or immediately after the time when the long-length media content is played, the media guidance application may store any metadata (e.g., title or genre) associated with that video in the long-media viewing profile. For example, if the user requested a "New York Giants" video clip, the media guidance application may store keywords "Giants" and "sports" in the long-media viewing profile.

In some embodiments, the media guidance application may generate a long-media viewing profile using the following sequence of steps. In some embodiments, the media guidance application may determine that the user is watching long-length media content. For example, the media guidance application may determine that the length of the currently provided media content exceeds the length threshold (e.g., 15 minutes). The media guidance application may then provide an advertisement to the user device during or immediately after the time when the long-length media content is played. For example, the media guidance application may provide an advertisement on the same device used to provide the media content or any other device associated with the user. For example, the media guidance application may provide an advertisement to the user's TV, telephone, or any other user device.

In some embodiments, the media guidance application may then monitor the user's response to the advertisement. For example, the media guidance application may monitor whether the user has interacted with the advertisement in any way. In some embodiments, any detected user interaction (e.g., a click) with the advertisement may be interpreted as favorable response. In some embodiments, the media guidance application may in response to determining that the user's response was favorable, store metadata associated with the advertisement.

In some embodiments, the media guidance application may activate one of the user profiles even when the user is not currently consuming any media content. In some embodiments, the media guidance application may analyze at least one of: time of day, user's location, and search input received from the user to determine whether the user is in the mood to watch long-length media content or short-length media content. For example, the media guidance application may have data indicating that the user is in the mood to watch long-length media content on weekend evenings. In this example, if the current time is after 6:00 PM on Saturday or Sunday, the media guidance application may determine that the user is in the mood to watch long-length media content. In another example, the media guidance application may have data indicating that the user is in the mood to watch short-length media content when the user is at work (e.g., on a lunch break). In this example, if the current user's location is the user's place of employment, the media guidance application may determine that the user is in the mood to watch short-length media content.

In some embodiments, the media guidance application may, in response to determining that the user is in the mood to watch long-length media content, activate the long-media viewing profile. For example, if the media guidance application determines that the user is in the mood to watch long-length media content based on the time-of-day information, the media guidance application may activate the long-media viewing profile even before the user requests any kind of media content for viewing.

In some embodiments, the media guidance application may, in response to determining that the user is in the mood to watch short-length media content, activate the short-media viewing profile. For example, if the media guidance application determines that the user is in the mood to watch short-length media content based on the user's location, the media guidance application may activate the short-media viewing profile even before the user requests any kind of media content for viewing.

In some embodiments, the media guidance application may provide the recommendation item to the user device using the following series of steps. In some embodiments, the media guidance application may determine whether the short-media viewing profile is active. If so, the media guidance application may select a short-length recommendation item that is associated with a second short-length media content. That is, when selecting a recommendation item, the media guidance application may consider only recommendation items that would recommend media content that has a short length. In some embodiments, the media guidance application may then provide the short-length recommendation item to the user device. That is, if the short-media viewing profile is active, in some embodiments, the media guidance application may provide recommendations only for other content that is short.

In some embodiments, the media guidance application may provide the recommendation item to the user device using the following series of steps. In some embodiments, the media guidance application may determine whether the long-media viewing profile is active. If so, the media guidance application may select a long-length recommendation item that is associated with second long-length media content. That is, when selecting a recommendation item, the media guidance application may consider only recommendation items that would recommend media content that has long length. In some embodiments, the media guidance application may then provide the long-length recommendation item to the user device. That is, if the long-media viewing profile is active, in some embodiments, the media guidance application may provide recommendations only for other content that is long.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
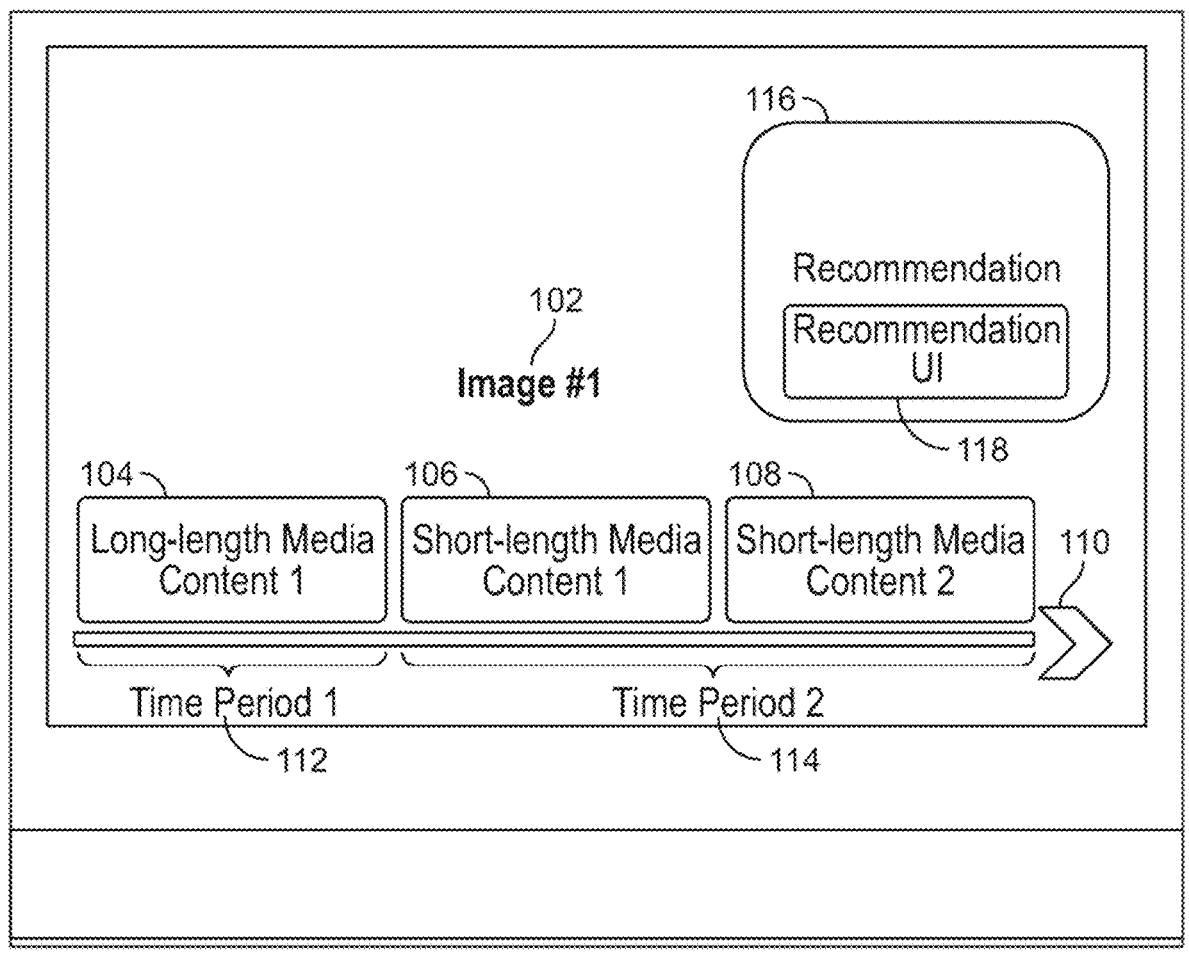
FIG. 1 shows an illustrative media guidance interface that may provide recommendations to a user, in accordance with some embodiments of the disclosure.

Systems and methods are disclosed herein for an improved method of providing recommendations to a user. In particular, the media guidance application may track the user's behavior while the user watches long- or short-length media content. The media guidance application may separately maintain two different user profiles, one for the user's preferences when watching long media, and one for the user's preferences when watching short media. Once the profiles are established, the media guidance application may provide improved recommendations (e.g., content suggestions or advertisements) to the user using the two profiles. For example, the media guidance application may use the short-media viewing profile to make recommendations while the user is watching short-length video, and use the long-media viewing profile to make recommendations while the user is watching long-length video. Consequently, such techniques improve the operation of the media guidance application by allowing it to make recommendations that are relevant to the user's current behavior.

As referred to herein, the phrase "long-length media content" refers to any type of media content (e.g., video, audio, or multimedia content) that exceeds a certain length threshold (e.g., 15 minutes). For example, a full-length movie running for 128 minutes or a 60-minute TV show episode may both be considered "long-length media content."

As referred to herein, the phrase "short-length media content" refers to any type of media content (e.g., video, audio, or multimedia content) that does not exceed a certain length threshold (e.g., 15 minutes). For example, a 5-minute news clip or 8-minute music video may both be considered "short-length media content."

As referred to herein, the phrase "short-media viewing profile" refers to any profile, data structure, or database that stores data indicative of the user's behavior or of the user's preferences during time periods when the user consumes short-length media content. In some embodiments, the short-media viewing profile may store a plurality of recommendation metadata that correspond to content that the user may prefer during such time periods.

As referred to herein, the phrase "long-media viewing profile" refers to any profile, data structure, or database that stores data indicative of the user's behavior or of the user's preferences during time periods when the user consumes long-length media content. In some embodiments, the long-media viewing profile may store a plurality of recommendation metadata that correspond to content that the user may prefer during such time periods.

As referred to herein, the phrase "recommendation item" refers to any media asset, text, multimedia, or data structure that is intended to provide a recommendation message to the user. In some embodiments, a recommendation item may be associated with a media content to be recommended, or with an advertisement to be provided. In some embodiments, a recommendation item may include metadata associated with the content to be recommended or with the advertisement to be provided.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows an illustrative media guidance interface on a display screen that may provide recommendations to a user in accordance with various embodiments of the disclosure. Display 100 shows a media guidance interface for video presentation, user interface presentation, and optional timeline presentation. In some embodiments, display 100 may display media content provided by the media guidance application. For example, display 100 may display image 102. Image 102 may be a part of media content provided by the media guidance application.

In some embodiments, display 100 may optionally include timeline 110 that indicates what media content is provided to the user. In some embodiments, timeline 110 may include time period 112, during which long-length media content 104 (e.g., full lengths movie "Titanic") is provided by the media guidance application. In some embodiments, timeline 110 may include time period 114, during which short-length media content 106 (e.g., music video "Thriller") and short-length media content 108 (e.g., music video "Beat It") are provided by the media guidance application.

In some embodiments, the media guidance application may maintain two different user profiles: a short-media viewing profile and a long-media viewing profile. In some embodiments, the short-media viewing profile may be generated or updated during time period 112 and during other time periods when other long-length media content is provided by the media guidance application. In some embodiments, the short-media viewing profile may be generated or updated during time period 114 and during other time periods when other short-length media content is provided by the media guidance application.

In some embodiments, the profiles are generated or updated based on the monitored user behavior. For example, if the user requests certain content or data during (or shortly after) time period 112, the media guidance application may store metadata associated with the requested content or requested data in the long-media viewing profile. Similarly, if the user requests certain content or data during (or shortly after) time period 114, the media guidance application may store metadata associated with the requested content or requested data in the short-media viewing profile.

In some embodiments, if the user interacts with (e.g., clicks on) an advertisement during (or shortly after) time period 112, the media guidance application may store metadata associated with that advertisement in the long-media viewing profile. In some embodiments, if the user interacts with (e.g., clicks on) an advertisement during (or shortly after) time period 114, the media guidance application may store metadata associated with that advertisement in the short-media viewing profile.

In some embodiments, the media guidance application may activate one of the profiles based on what media content is currently being provided. For example, if long-length media content is provided (e.g. during time period 112), the media guidance application may activate the long-media viewing profile. In another example, if short-length media content is provided (e.g. during time period 114), the media guidance application may activate the short-media viewing profile.

In some embodiments, the media guidance application may provide a recommendation to the user based on which profile is activated. For example, the media guidance application may provide for display recommendations based on the long-media viewing profile during the during time period 112, and provide for display recommendations based on the short-media viewing profile during the during time period 114.

In some embodiments, the media guidance application may provide recommendation 116 for display. In some embodiments, the media guidance application may base the content of recommendation 116 based on which profile is active. In some embodiments, the media guidance application may provide recommendation 116 on display 100. In some embodiments, the media guidance application may generate a recommendation for display on any other device, such as user's mobile device, user's computer, or user's audio equipment.

In some embodiments, recommendation 116 may comprise text recommending another media content for consumption. For example, if the long-media viewing profile is active, recommendation 116 may include text "Would like to watch 'Titanic'" or "would you like to add 'Titanic' to your play list." In this example, the media guidance application may have selected to recommend the "Titanic" movie (length: 195 minutes) because it is a full-feature movie, and the user is currently watching long-length media.

In some embodiments, if the short-media viewing profile is active, recommendation 116 may include text "Would like to watch 'Thriller' music" video, or "would you like to add 'Thriller' music video to your play list." In this example, the media guidance application may have selected to recommend the 'Thriller' music video (length: 14 minutes) because it is a short music video, and the user is currently watching short-length media.

In some embodiments, recommendation 116 may be a filtered list of several content items, where items that are more highly recommended are listed near the top. For example, during time period 112, recommendation for long-length media content may be shown near the top of the list, while during time period 114, recommendation for short-length media content may be shown near the top of the list.

In some embodiments, recommendation 116 may be and advertisement for a product or service. In some embodiments, the media guidance application may select the advertisement based on which profile is active. In some embodiments, the media guidance application may select the advertisement that has the highest chance to elicit a positive interaction. For example, if the user has positively reacted to a pizza advertisement when short-media profile was active (e.g., during time period 114) but not when long-media profile was active (e.g., during time period 112), the media guidance application may only provide pizza advertainments when short-media profile is active. For example, recommendation 116 may include text "Call 180-555-PIZZA, and mentioned code "ABC" to get pizza at 30% off."

In some embodiments, the media guidance application may provide recommendation 116 for display during or shortly after the presentation of the current media content is concluded. For example, after the presentation of the current media content ends, or right before the end, media guidance application may display recommendation 116 on display 100. In some embodiments, recommendations 116 includes a list of suggested media content. The list may be generated and sorted according to what viewing profile if active. For example, if short-media profile is active, the list may include only short-length media content, or may be sorted to display short-length media before long-length media content. In some embodiments, if long-media profile is active, the list may include only long-length media content, or may be sorted to display long-length media before long-length media content. In some embodiments, the media guidance application may provide for display the next media content based on a user selection from the list.

In some embodiments, the media guidance application may automatically play the next media content from the list even without user input. In some embodiments, the media guidance application may keep the list hidden from the user, and not display it to the user. Instead, next media content may be provided to the user according to the list without the need for user input.

In some embodiments, the media guidance application may also provide for display recommendation user interface (UI) 118. In some embodiments, recommendation UI 118 may be a part of recommendation 116. For example, if recommendation 116 includes a recommendation of media content, recommendation UI 118 may include interface options (e.g., buttons) that allow the user to either purchase the media content, begin watching that media content immediately, or to set a reminder to watch that media content in the future.

In some embodiments, if recommendation 116 includes an advertisement, recommendation UI 118 may include interface options (e.g., buttons) that allow the user to interact with that advertisement. For example, if the advertisement includes a URL, recommendation UI 118 may include a hyperlink that allows the user to request a website associated with that URL. In another example, if the advertisement includes a phone number, recommendation UI 118 may include a link to an application that can auto-dial that phone number.

Figure 2:
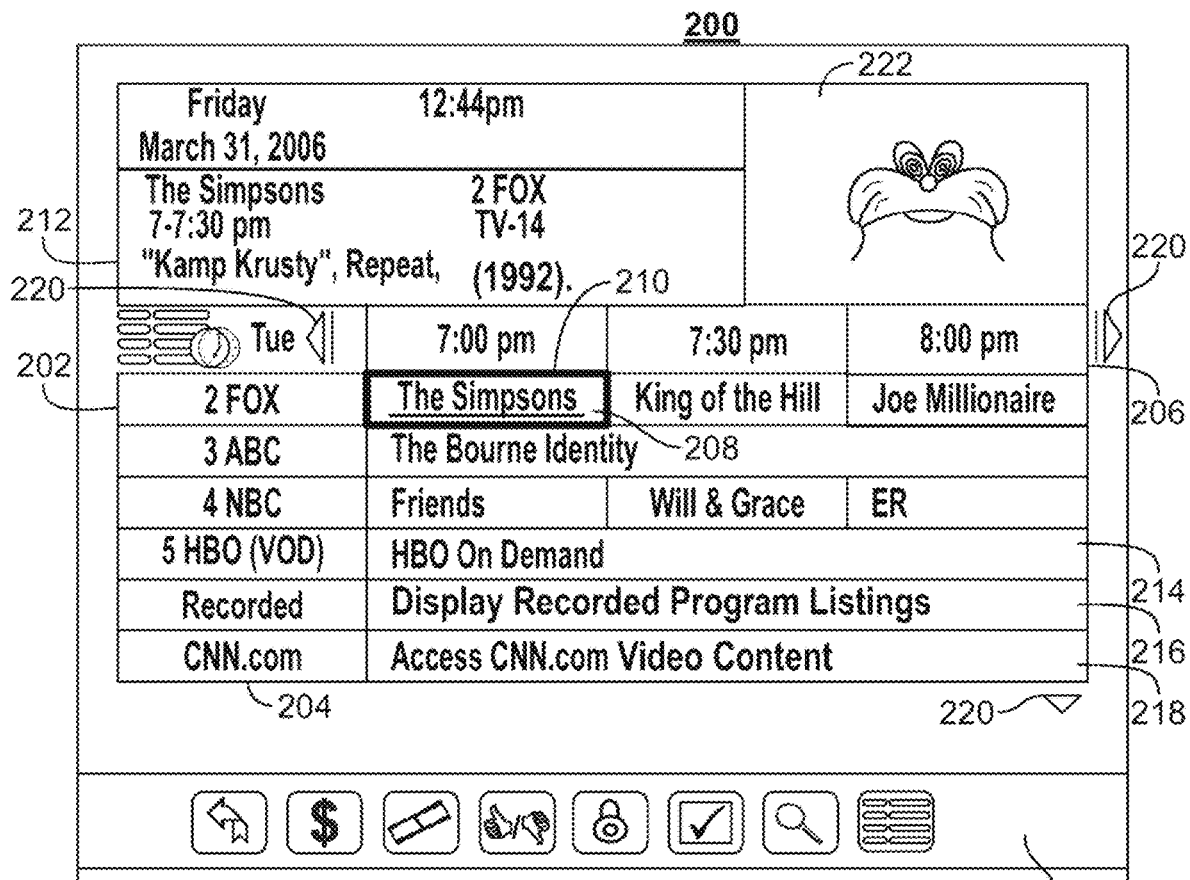
FIG. 2 shows another illustrative media guidance interface that may dynamically include or exclude a video, in accordance with some embodiments of the disclosure.
Figure 3:
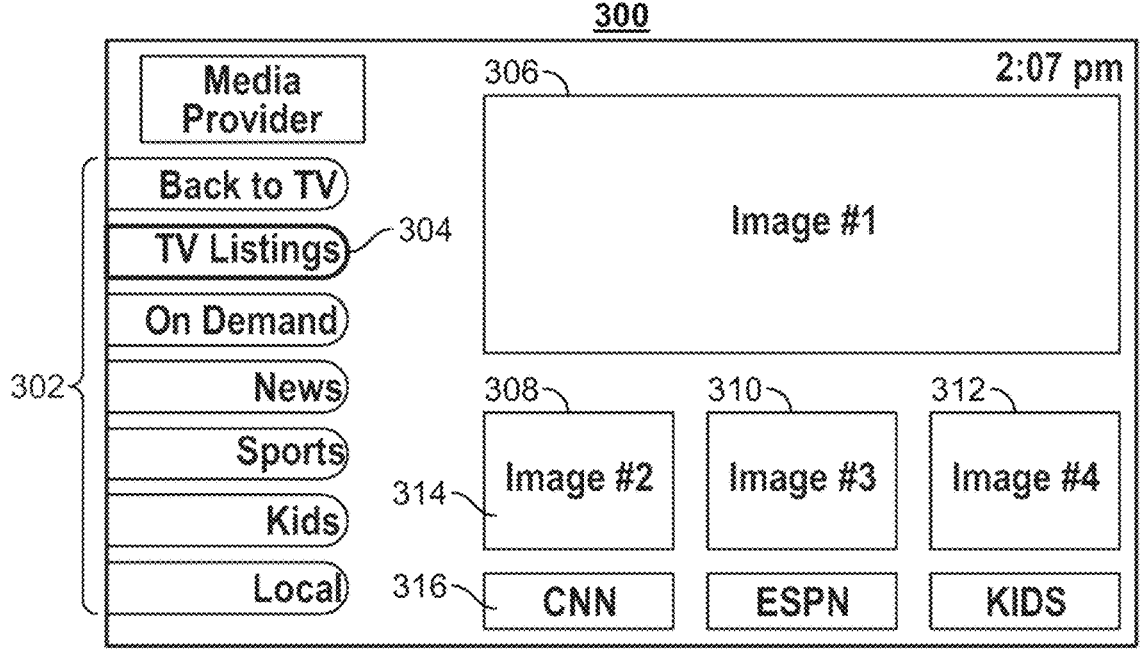
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
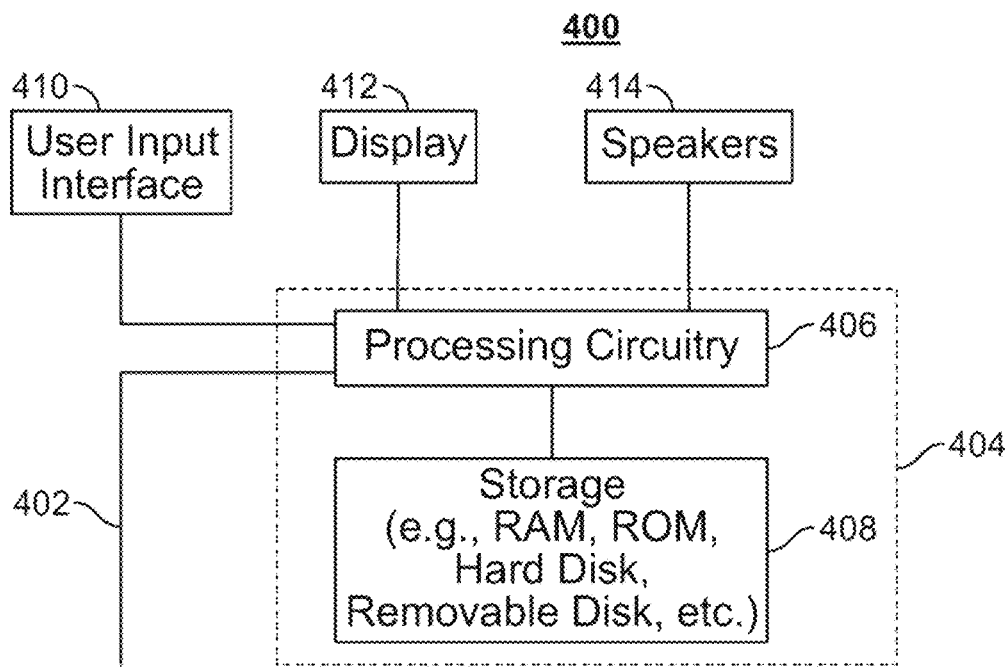
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
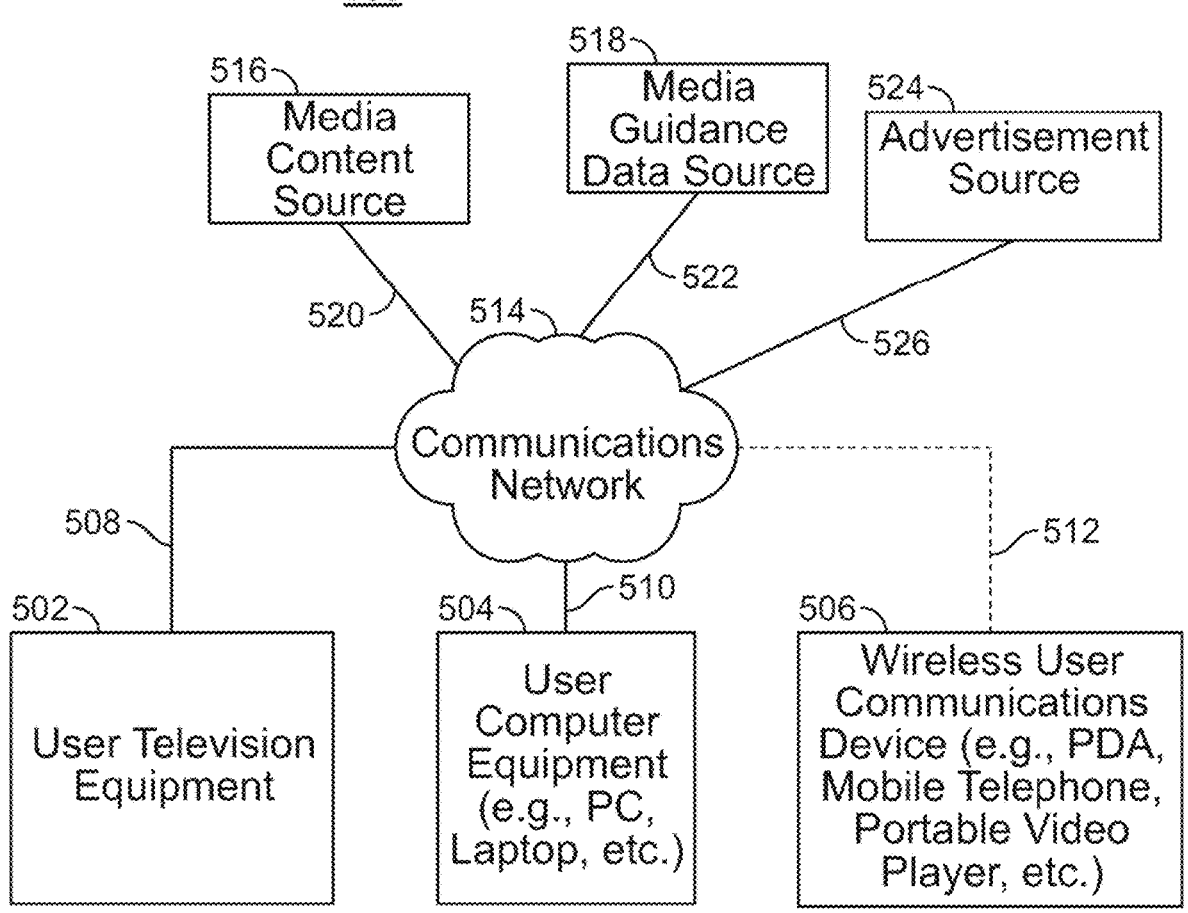
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition, or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
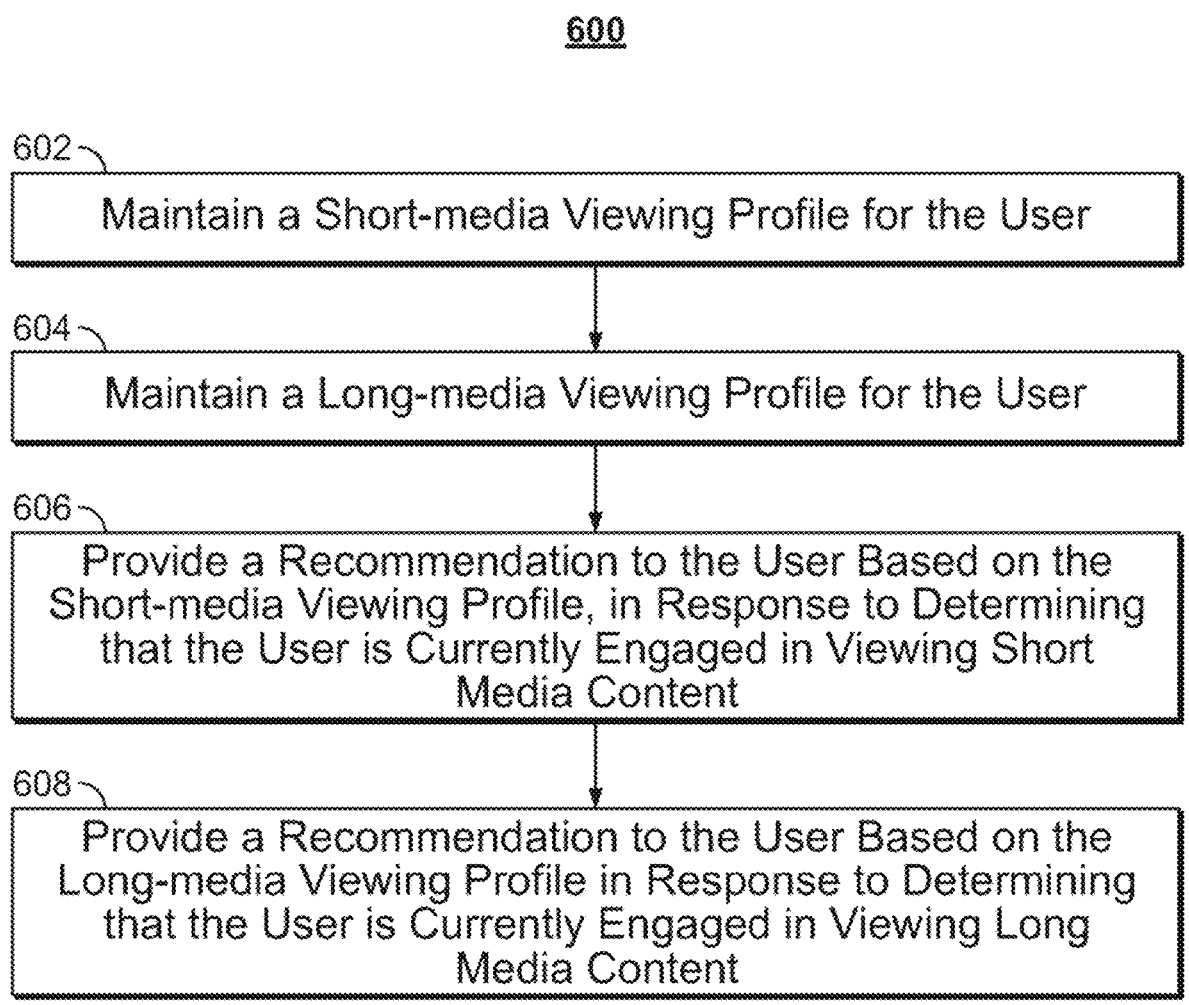
FIG. 6 depicts an illustrative flow diagram for a process of providing recommendations to a user in accordance with some embodiments of the disclosure.

FIG. 6 depicts an illustrative flow diagram of a process 600 for providing recommendations to a user in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, any of the steps 602-608 of FIG. 6 may be optionally omitted. In some embodiments, any of the steps 602-608 of FIG. 6 may be performed in any order or simultaneously.

Process 600 begins at 602, where control circuitry 404 maintains a short-media viewing profile for the user. In some embodiments, control circuitry 404 may store the short-media viewing profile in storage 408. In some embodiments, the short-media viewing profile may be stored at media guidance data source 518.

For example, control circuitry 404 may track the user's behavior during time periods (e.g. time period 114) when the user is consuming short-length media content. In some embodiments, control circuitry 404 may then record the user's interaction in the short-media viewing profile. For example, if the user requests other media content during these time periods, control circuitry 404 may record metadata associated with that other media content in the short-media viewing profile. The other media content may be requested by the user via user television equipment 502 or any other user device, such as user computer equipment 504. In another example, if the user interacts with an advertisement during these time periods, control circuitry 404 may record metadata associated with that advertisement in the short-media viewing profile. The advertisement may be presented on user television equipment 502, on display 100, or on any device of user computer equipment 504. The user may interact with the advertisement via user interface input 410, via recommendation UI 118, or via input on any device of user computer equipment 504.

Process 600 continues at 604, where control circuitry 404 maintains a long-media viewing profile for the user. Steps 602 and 604 may be performed in any order or concurrently with one another. In some embodiments, control circuitry 404 may store the long-media viewing profile in storage 408. In some embodiments, the long-media viewing profile may be stored at media guidance data source 518.

For example, control circuitry 404 may track the user's behavior during time periods (e.g. time period 112) when the user is consuming long-length media content. In some embodiments, control circuitry 404 may then record user's interaction in the long-media viewing profile. For example, if the user requests other media content during these time periods, control circuitry 404 may record metadata associated with that other media content in the long-media viewing profile. The other media content may be requested by the user via user television equipment 502 or any other user device, such as user computer equipment 504. In another example, if the user interacts with an advertisement during these time periods, control circuitry 404 may record metadata associated with that long in the long-media viewing profile. The advertisement may be presented on user television equipment 502, on display 100, or on any device of user computer equipment 504. The user may interact with the advertisement via user interface input 410, via recommendation UI 118, or by input on any device of user computer equipment 504.

Process 600 continues at 606 where control circuitry 404 provides a recommendation (e.g., recommendation 116) to the user based on the short-media viewing profile. In some embodiments, control circuitry 404 may provide such a recommendation in response to determining that the user is currently engaged in viewing short-length media content. For example, if control circuitry 404 determines that the user is currently engaged in viewing short-length media content (e.g., during time period 114), control circuitry 404 may use the short-media viewing profile to provide a recommendation for display.

In some embodiments, control circuitry 404 may select a recommendation that has metadata that matches recommendation metadata stored in the short-media viewing profile. For example, if the short-media viewing profile includes stored metadata keyword "pizza," control circuitry 404 may select a recommendation (e.g., a Domino's Pizza advertisement) that has metadata (e.g., metadata keyword "pizza") matching the stored metadata. Control circuitry 404 may then provide the selected recommendation for display. In one example, control circuitry 404 may provide the Domino's Pizza ad on display 100, on user television equipment 502, or on user computer equipment 504.

Process 600 continues at 608 where control circuitry 404 provides a recommendation (e.g., recommendation 116) to the user based on the long-media viewing profile. In some embodiments, steps 606 and 608 may be performed in any order. In some embodiments, control circuitry 404 may provide such a recommendation in response to determining that the user is currently engaged in viewing long-length media content. For example, if control circuitry 404 determines that the user is currently engaged in viewing long-length media content (e.g., during period 112), control circuitry 404 may use the long-media viewing profile to provide a recommendation for display.

In some embodiments, control circuitry 404 may select a recommendation that has metadata that matches recommendation metadata stored in the long-media viewing profile. For example, if the long-media viewing profile includes stored metadata keyword "car," control circuitry 404 may select a recommendation (e.g., a Ford car ad) that has metadata (e.g., metadata keyword "car") matching the stored metadata. Control circuitry 404 may then provide the selected recommendation for display. In one example, control circuitry 404 may provide the Ford car ad on display 100, on user television equipment 502, or on user computer equipment 504.

Figure 7:
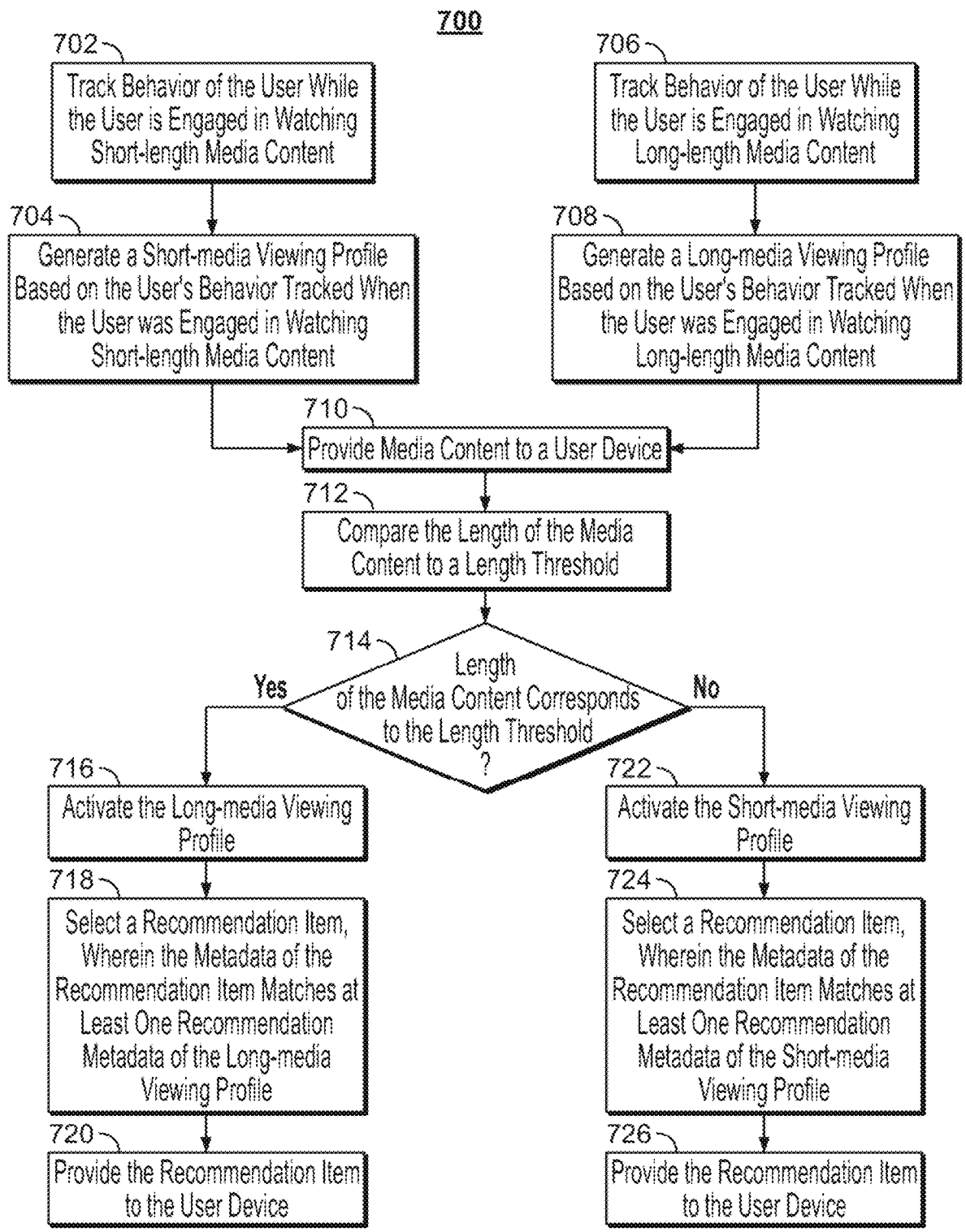
FIG. 7 depicts another illustrative flow diagram for a process of providing recommendations to a user in accordance with some embodiments of the disclosure.

FIG. 7 depicts an illustrative flow diagram of another process 700 for providing recommendations to a user in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, any of the steps 702-726 of FIG. 7 may be optionally omitted. In some embodiments, any of the steps 702-626 of FIG. 7 may be performed in any order or simultaneously.

Process 700 begins at steps 702-704 and 706-708. In some embodiments, sequences of steps 702, 704 and 706, 708 may be performed in any order or interspersed with each other.

At 702, control circuitry 404 tracks behavior of the user while the user is engaged in watching short-length media content (e.g. during time period 114). For example, control circuitry 404 may track the user's behavior when the user watches media content that is shorter than a certain length threshold (e.g., 15 minutes.) In some embodiments, any other length threshold may be used.

At 704, control circuitry 404 may generate a short-media viewing profile based on the user's behavior tracked when the user was engaged in watching short-length media content (e.g., during time period 114). In some embodiments, control circuitry 404 may track the user's requests for other media content (e.g., requests for other video via user television equipment 502), track the user's requests for other data (e.g., user request for a web page via user computer equipment 504), or track any of the user's interaction with content (e.g., requests for trick play modes via use imputer interface 410), or the user's interaction with provided advertisements (e.g., user clicking on a pop-up ad). The tracked behavior may be used by control circuitry 404 to generate recommendation metadata which is then stored in the short-media viewing profile.

At 706, control circuitry 404 tracks behavior of the user while the user is engaged in watching long-length media content (e.g. during time period 112). For example, control circuitry 404 may track the user's behavior when the user watches media content that is equal to or longer than a certain length threshold (e.g., 15 minutes.)

At 708, control circuitry 404 may generate a long-media viewing profile based on the user's behavior tracked when the user was engaged in watching long-length media content (e.g., during time period 112). In some embodiments, control circuitry 404 may track user's requests for other media content (e.g., requests for other video via user television equipment 502), track the user's requests for other data (e.g., user request for a web-page via user computer equipment 504), or track any of the user's interaction with content (e.g., requests for trick play modes via use imputer interface 410), or the user's interaction with provided advertisements (e.g., user clicking on a pop-up ad). The tracked behavior may be used by control circuitry 404 to generate recommendation metadata which is then stored in the long-media viewing profile.

Process 700 continues at 710, where circuitry 404 provides media content to a user device. For example, the media guidance application running on control circuitry 404 may generate media content for display on a display 412 of user television equipment 502. The media content may be generated for display by way of an explicit user selection to play the video, as a result of the user equipment being powered on, or by any other triggering events.

Process 700 continues to 712, where control circuitry 404 compares the length of the media content to a length threshold. For example, the length threshold may pre-set at a certain time value (e.g., 15 minutes). Control circuitry 404 may dynamically generate the length threshold based on factors including at least one of a user profile, metadata of the provided media content, popularity of the media content, and type of the media content, or any combination thereof. For example, control circuitry 404 may set the length threshold differently for news videos and for videos depicting fictional content. In some embodiments, control circuitry 404 may retrieve the length of the media content from media content data source 516 or media guidance data source 518.

In some embodiments, the length threshold may be set differently for different users. In some embodiments, control circuitry 404 may set the length threshold differently depending on demographic information of the user. For example, control circuitry 404 may set the length threshold lower (e.g. to 5 minutes) for young users (e.g., users under the age of 10) and higher (e.g., to 15 minutes) for older users.

Process 700 continues to 714, where process 700 may proceed to steps 716-720 if the length of the media content corresponds to (e.g., equals or exceeds) the length threshold (e.g., 15 minutes). Alternatively, process 700 may proceed to steps 722-726 if the length of the media content does not correspond to (e.g., does not equals exceed) the length threshold (e.g., 15 minutes).

At 716, control circuitry 404 may activate the long-media viewing profile. That is, while the long-media viewing profile is active, control circuitry 404 may modify that viewing profile based on the tracked behavior of the user. In some embodiments, recommendations provided by control circuitry 404 will also be based on the activated long-media viewing profile.

At 718, control circuitry 404 may select a recommendation item. For example, a recommendation item may be selected from media guidance data source 518 (e.g., if the recommendation item is associated with media content) or from advertisement source 524 (e.g., if the recommendation item is associated with an advertisement).

In some embodiments, control circuitry 404 may select the recommendation item such that the metadata of the recommendation item matches at least one recommendation metadata of the long-media viewing profile. For example, control circuitry 404 may match keywords associated with a media content database stored at media guidance data source 518. In another example, control circuitry 404 may match keywords associated with an advertisement database stored at advertisement source 524. If the metadata of the recommendation item sufficiently matches at least some of the metadata stored in the long-media viewing profile, control circuitry 404 may select that recommendation item for presentation.

At 720, control circuitry 404 may provide recommendation item to the user device. For example, the recommendation item may be displayed on display 100 as recommendation 116. In some embodiments, control circuitry 404 may provide recommendation item to user computer equipment 504.

At 722, control circuitry 404 may activate the short-media viewing profile. That is, while the short-media viewing profile is active, control circuitry 404 may modify that viewing profile based on the tracked behavior of the user. In some embodiments, recommendations provided by control circuitry 404 will also be based on the activated short-media viewing profile.

At 724, control circuitry 404 may select a recommendation item. For example, a recommendation item may be selected from media guidance data source 518 (e.g., if the recommendation item is associated with media content) or from advertisement source 524 (e.g., if the recommendation item is associated with an advertisement).

In some embodiments, control circuitry 404 may select the recommendation item, such that the metadata of the recommendation item matches at least one recommendation metadata of the short-media viewing profile. For example, control circuitry 404 may match keywords associated with media content database stored at media guidance data source 518. In another example, control circuitry 404 may match keywords associated with an advertisement database stored at advertisement sources 524. If the metadata of the recommendation item sufficiently matches at least some of the metadata stored in the short-media viewing profile, control circuitry 404 may select that recommendation item for presentation.

At 726, control circuitry 404 may provide a recommendation item to the user device. For example, the recommendation item may be displayed on display 100 as recommendation 116. In some embodiments, control circuitry 404 may provide a recommendation item to user computer equipment 504.

Figure 8:
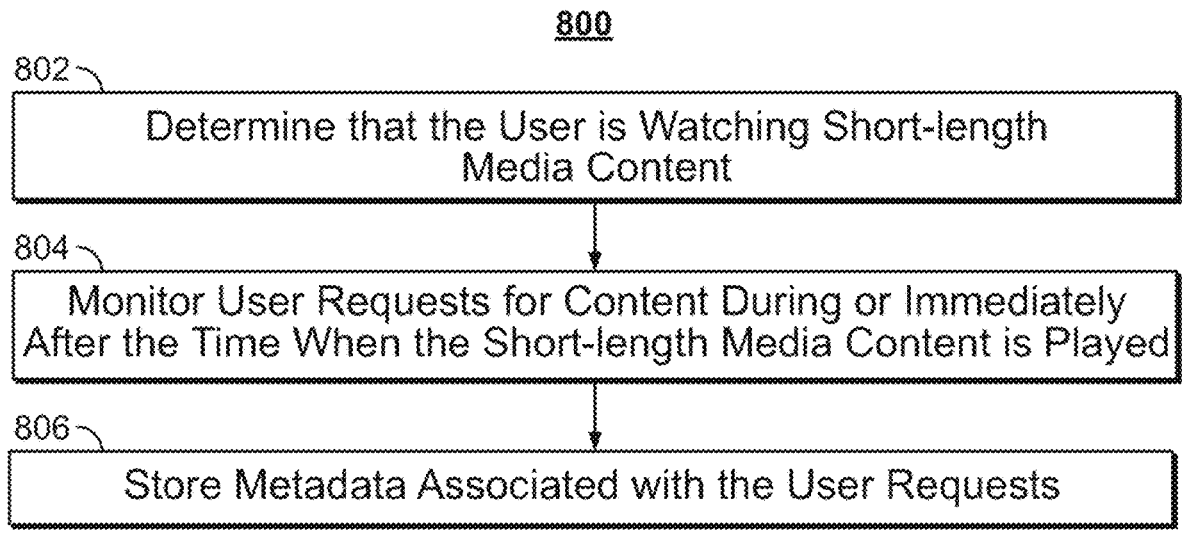
FIG. 8 depicts an illustrative flow diagram for a process of generating a short-media viewing profile in accordance with some embodiments of the disclosure.

FIG. 8 depicts an illustrative flow diagram of a process 800 for generating a short-media viewing profile in accordance with some embodiments of the disclosure. Process 800 may be executed by control circuitry 404, for example, in a manner instructed to control circuitry 404 by the media guidance application. In some embodiments, process 800 may be performed as part of block 704. In some embodiments, any of the steps 802-808 of FIG. 8 may be optionally omitted. In some embodiments, any of the steps 802-808 of FIG. 8 may be performed in any order or simultaneously.

Process 800 begins at 802, where control circuitry 404 may determine that the user is watching short-length media content. For example, control circuitry 404 may determine that the content that is currently provided to the media device has a length that does not exceed a certain threshold (e.g. 15 minutes.) In response to this determination, control circuitry 404 may proceed to block 804.

Process 800 continues to 804, where control circuitry 404 may monitor user requests for content during or immediately after the time when the short-length media content is played. For example, control circuitry 404 may analyze any request for media content, for web pages, or for any other data generated by the user via either user television equipment 502 or user computer equipment 504.

Process 800 continues to 806, where control circuitry 404 may store metadata associated with the user requests. In some embodiments, control circuitry 404 may generate or modify the short-media viewing profile to include a plurality of recommendation metadata. For example, the recommendation metadata may be generated by copying metadata of content requested by the user. For example, if the user requested the music video "Thriller" while watching short-length media content (e.g., during time period 114), control circuitry 404 may store metadata associated with that music video in the short-media viewing profile as recommendation metadata. In this example, control circuitry 404 may store keywords such as "thriller," "Michael Jackson," and "pop music" in the short-media viewing profile as recommendation metadata. In another example, if the user requested the website www.toyota.com while watching short-length media content (e.g., during time period 114), control circuitry 404 may store metadata associated with that website in the short-media viewing profile as recommendation metadata. In this example, control circuitry 404 may store keywords such as "Toyota," or "car" in the short-media viewing profile as recommendation metadata.

Figure 9:
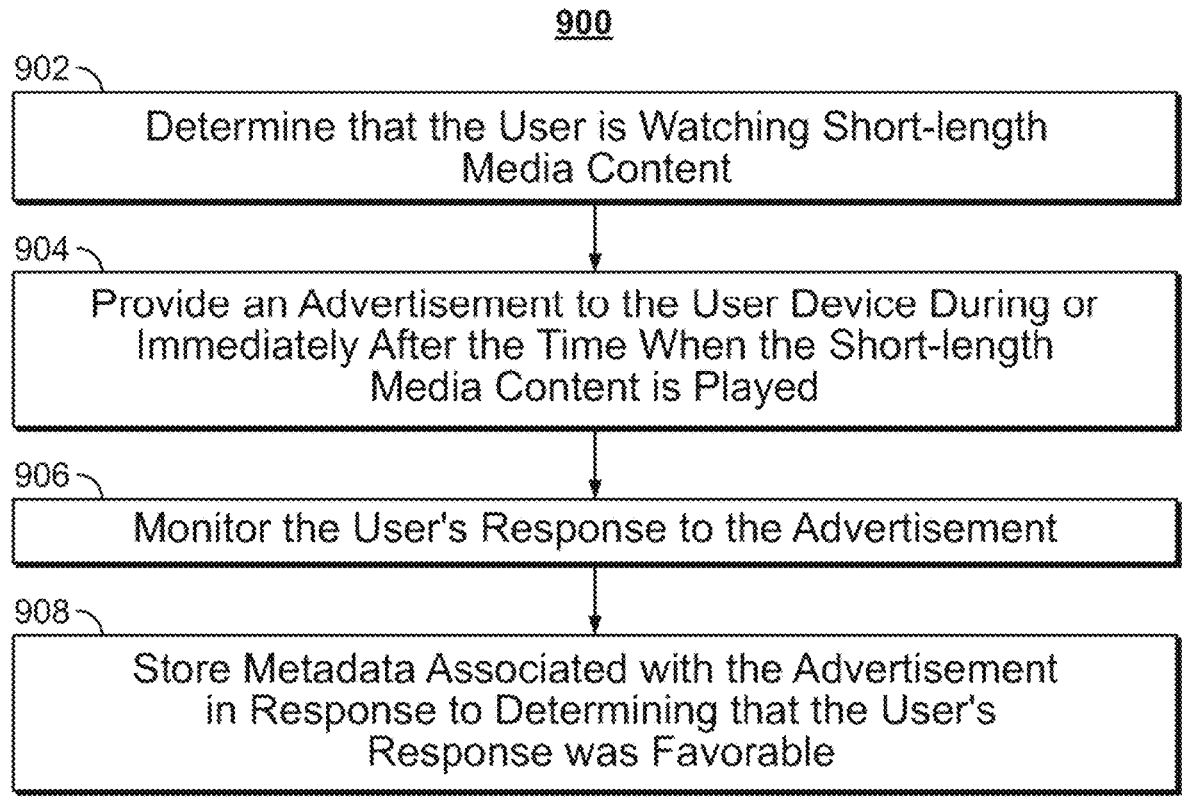
FIG. 9 depicts another illustrative flow diagram for a process for generating a short-media viewing profile in accordance with some embodiments of the disclosure.

FIG. 9 depicts another illustrative flow diagram of a process 900 for generating a short-media viewing profile in accordance with some embodiments of the disclosure. Process 900 may be executed by control circuitry 404, for example, in a manner instructed to control circuitry 404 by the media guidance application. In some embodiments, process 900 may be performed as part of block 704. In some embodiments, any of the steps 902-908 of FIG. 6 may be optionally omitted. In some embodiments, any of the steps 902-908 of FIG. 9 may be performed in any order or simultaneously.

Process 900 begins at 902, where control circuitry 404 may determine that the user is watching short-length media content. For example, control circuitry 404 may determine that the content that is currently provided to the media device has a length that does exceed a certain threshold (e.g. 15 minutes.) In response to this determination, control circuitry 404 may proceed to block 904.

Process 900 continues to 904, where control circuitry 404 may provide an advertisement to the user device during or immediately after the time when the short-length media content is played. For example, control circuitry 404 may retrieve an advertisement from advertisement source 524 and deliver it to user television equipment 502 or to user computer equipment 504.

Process 900 continues to 906, where control circuitry 404 may monitor the user's response to the advertisement. For example, control circuitry 404 may track whether the user clicked on or otherwise interacted with the advertisement via user input interface 410 or via user computer equipment 504. Control circuitry 404 may also track whether the user ignored or closed the advertisement. In some embodiments, if control circuitry 404 determined that the user reacted favorably to the advertisement (e.g., if the advertainments was clicked), control circuitry 404 may proceed to block 908.

Process 900 continues to 908, where control circuitry 404 may store metadata associated with the advertisement. For example, if a user reacted favorably to an ad about Domino's Pizza, control circuitry 404 may store keywords "Pizza," or "Domino's," or "takeout" as recommendation metadata in the short-media viewing profile.

Figure 10:
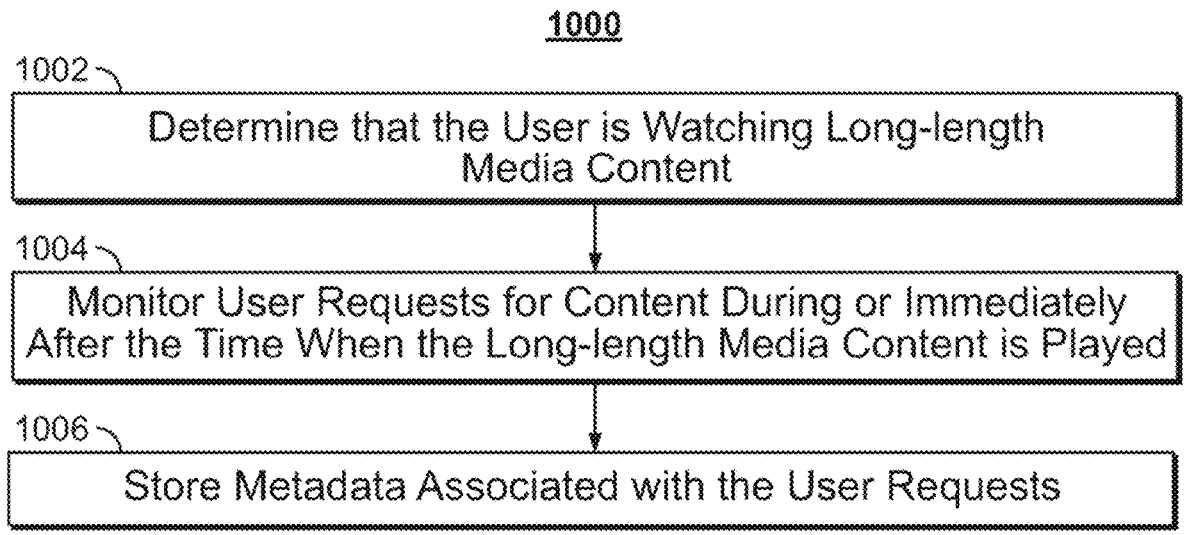
FIG. 10 depicts an illustrative flow diagram for a process of generating a long-media viewing profile in accordance with some embodiments of the disclosure.

FIG. 10 depicts an illustrative flow diagram of a process 1000 for generating a long-media viewing profile in accordance with some embodiments of the disclosure. Process 1000 may be executed by control circuitry 404, for example, in a manner instructed to control circuitry 404 by the media guidance application. In some embodiments, process 800 may be performed as part of block 704. In some embodiments, any of the steps 1002-1006 of FIG. 10 may be optionally omitted. In some embodiments, any of the steps 1002-1008 of FIG. 10 may be performed in any order or simultaneously.

Process 1000 begins at 1002, where control circuitry 404 may determine that the user is watching long-length media content. For example, control circuitry 404 may determine that the content that is currently provided to the media device has a length that exceeds a certain threshold (e.g. 15 minutes.) In response to this determination, control circuitry 404 may proceed to block 1004.

Process 1000 continues to 1004, where control circuitry 404 may monitor user requests for content during or immediately after the time when the long-length media content is played. For example, control circuitry 404 may analyze any request for media content, for web pages, or for any other data generated by the user via either user television equipment 502 or user computer equipment 504.

Process 1000 continues to 1006, where control circuitry 404 may store metadata associated with the user requests. In some embodiments, control circuitry 404 may generate or modify the long-media viewing profile to include a plurality of recommendation metadata. For example, the recommendation metadata may be generated by copying metadata of content requested by the user. For example, if the user requested the movie "Titanic" while watching long-length media content (e.g., during time period 112), control circuitry 404 may store metadata associated with that movie in the long-media viewing profile as recommendation metadata. In this example, control circuitry 404 may store keywords such as "Titanic," "Leonardo DiCaprio," and "romantic movies" in the long-media viewing profile as recommendation metadata. In another example, if the user requests the website www.subway.com, while watching long-length media content (e.g., during time period 112), control circuitry 404 may store metadata associated with that website in the long-media viewing profile as recommendation metadata. In this example, control circuitry 404 may store keywords such as "sandwich," or "sub" in the long-media viewing profile as recommendation metadata.

Figure 11:
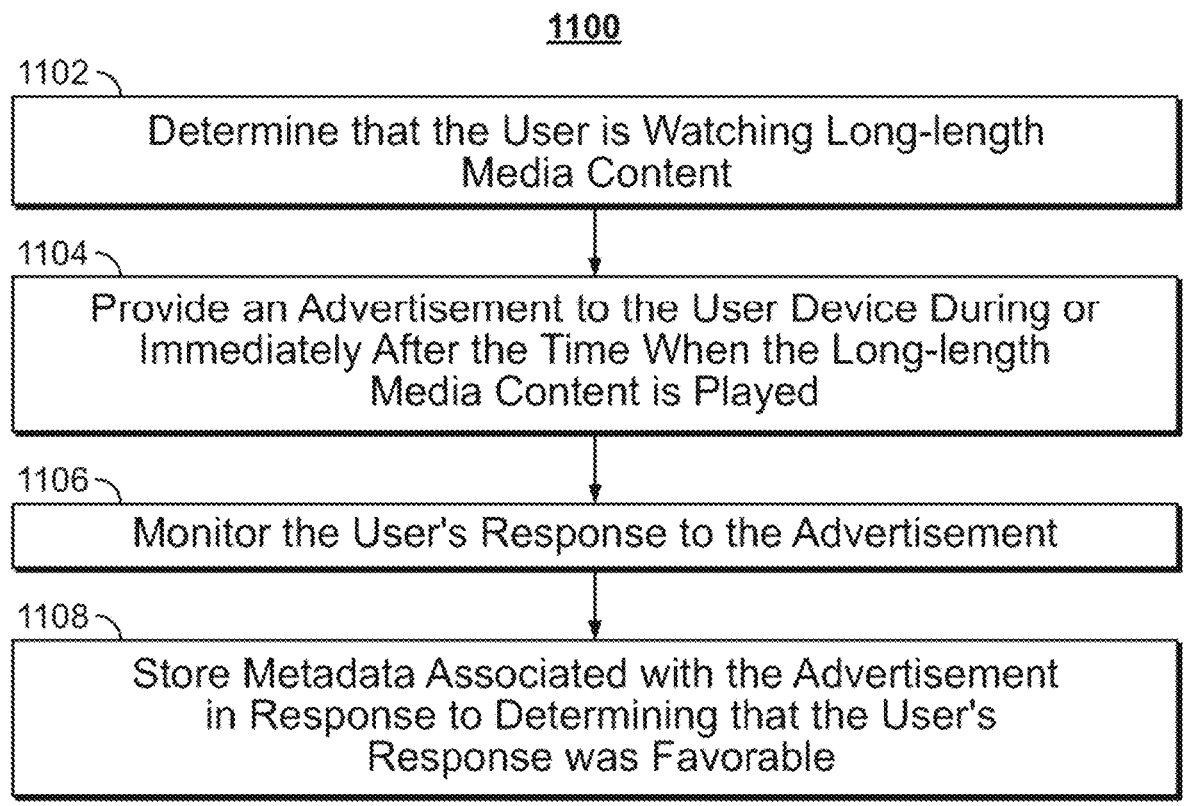
FIG. 11 depicts another illustrative flow diagram for a process for generating a long-media viewing profile in accordance with some embodiments of the disclosure.

FIG. 11 depicts another illustrative flow diagram of a process 1100 for generating a long-media viewing profile in accordance with some embodiments of the disclosure. Process 1100 may be executed by control circuitry 404, for example, in a manner instructed to control circuitry 404 by the media guidance application. In some embodiments, process 1100 may be performed as part of block 708. In some embodiments, any of the steps 1102-1108 of FIG. 11 may be optionally omitted. In some embodiments, any of the steps 1102-1108 of FIG. 11 may be performed in any order or simultaneously.

Process 1100 begins at 1102, where control circuitry 404 may determine that the user is watching long-length media content. For example, control circuitry 404 may determine that the content that is currently provided to the media device has a length that exceeds a certain threshold (e.g. 15 minutes.) In response to this determination, control circuitry 404 may proceed to block 1104.

Process 1100 continues to 1104, where control circuitry 404 may provide an advertisement to the user device during or immediately after the time when the long-length media content is played. For example, control circuitry 404 may retrieve an advertisement from advertisement source 524 and deliver it to user television equipment 502 or to user computer equipment 504.

Process 1100 continues to 1106, where control circuitry 404 may monitor the user's response to the advertisement. For example, control circuitry 404 may track whether the user clicked on or otherwise interacted with the advertisement via user input interface 410 or via user computer equipment 504. Control circuitry 404 may also track whether the user ignored or closed the advertisement. In some embodiments, if control circuitry 404 determined that the user reacted favorably to the advertiser (e.g., if the advertisement was clicked), control circuitry 404 may proceed to block 1108.

Process 1100 continues to 1108, where control circuitry 404 may store metadata associated with the advertisement. For example, if a user reacted favorably to an add about Ford cars, control circuitry 404 may store keywords "Ford," or "car," or "sedan" as recommendation metadata in the long-media viewing profile.

Figure 12:
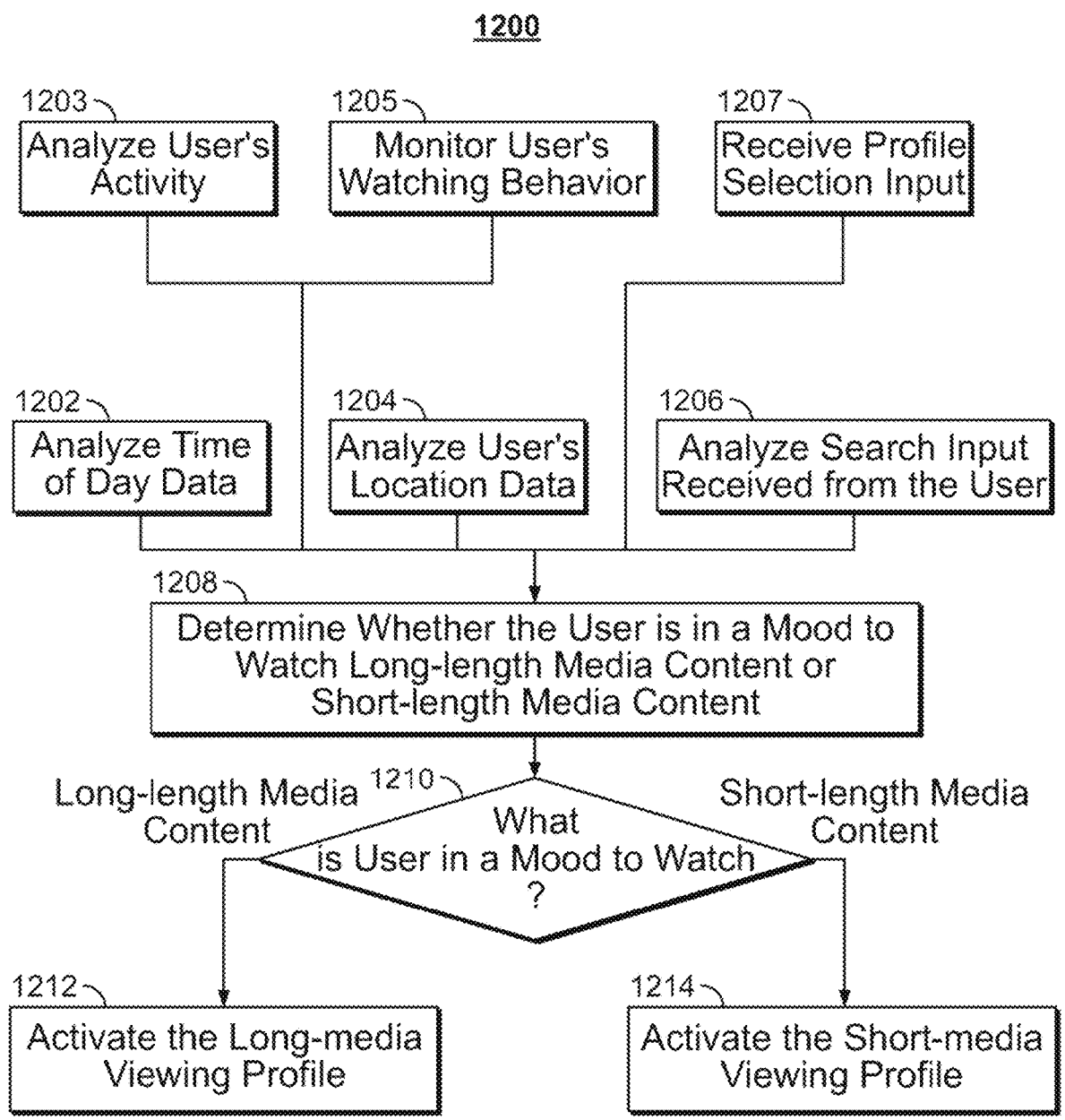
FIG. 12 depicts an illustrative flow diagram for a process of activating either the long-media viewing profile or the short-media viewing profile in accordance with some embodiments of the disclosure.

FIG. 12 depicts an illustrative flow diagram of a process 1200 for activating either the long-media viewing profile or the short-media viewing profile in accordance with some embodiments of the disclosure. Process 1200 may be executed by control circuitry 404, for example, in a manner instructed to control circuitry 404 by the media guidance application. In some embodiments, process 1200 may be performed as part of either block 716 or 722. In some embodiments, control circuitry 404 may activate either the short-media viewing profile or the long-media watching profile without determining the length of the media content (e.g. at block 712). In some embodiments, any of the steps 1202-1214 of FIG. 12 may be optionally omitted. In some embodiments, any of the steps 1202-1214 of FIG. 12 may be performed in any order or simultaneously.

Process 1200 begins at blocks 1202, 1203, 1204, 1205, 1206, and 1207. In some embodiments, process 1200 may perform any one or any combination of these blocks in any order or simultaneously.

At 1202, control circuitry 404 may analyze the time-of-day data. For example, control circuitry 404 may determine the current time and current date. For example, control circuitry 404 may retrieve the time data from user television equipment 502, user computer equipment 504, or from an internal clock.

At 1203, control circuitry 404 may analyze any type of data about the user to determine what activity the user is currently engaged in. For example, calendar data and appointment data may be used by control circuitry 404 to determine what activity the user has scheduled at the time. In some embodiments, control circuitry 404 may determine if the user is walking, jogging, or driving based on the calendar data. In some embodiments, control circuitry 404 may determine the user's activity based on location (e.g., GPS) data. For example, the user's speed may be used to determine if the user is walking, jogging, or driving. In some embodiments, user's current requests may be used to determine the user's activity. For example, if the user opens a recipe webpage and keeps it open for a certain period of time, control circuitry 404 may determine that the user in engaged in a cooking activity. In some embodiments, any other data may be used to determine any other user activity.

At 1204, control circuitry 404 may analyze user's location. For example, control circuitry 404 may determine the user's location based on the IP address of user computer equipment 504. In some embodiments, control circuitry 404 may retrieve GPS data from user computer equipment 504 to determine the user's location.

At 1205, control circuitry 404 may monitor and analyze user's watching behavior. For example, control circuitry 404 may monitor the user's trick-play mode requests. In some embodiments, control circuitry 404 may monitor if the user frequently pauses the media content he or she currently watches. In some embodiments, control circuitry 404 may analyze whether the user has abruptly stopped watching long-length media content.

At 1206, control circuitry 404 may analyze the user's search input. For example, control circuitry 404 may track recent search inputs received from user computer equipment 504. For example, if the user searches for "car dealership," control circuitry 404 may analyze the content of that search.

At 1207, control circuitry 404 may receive an explicit profile selection input from the user, e.g. via user input interface 410. For example, the user may explicitly select (e.g., via a radio button input) an option "long-length mode" or an option "short-length mode."

Process 1200 continues to 1208 where control circuitry 404 determines whether the user is in the mood to watch long-length media content or short-length media content based on analysis of either one or several of blocks 1202-1206. For example, the control circuitry 404 may have data (e.g., in storage 408) indicating that the user is in the mood to watch long-length media content on weekend evenings. In this example, if the current time was determined to be 8:15 PM on Saturday or Sunday (e.g., in block 1202), control circuitry 404 may determine that the user is in the mood to watch long-length media content. In another example, control circuitry 404 may have data indicating that the user is in the mood to watch short-length media content when the user is at work (e.g., on a lunch break). In this example, if the current user's location was determined to be the user's place of employment (e.g., at block 1204), control circuitry 404 may determine that the user is in the mood to watch short-length media content. In another example, if control circuitry 404 determines (e.g., at 1206) that the user's search related to long-length media, control circuitry 404 may determine that that the user is in the mood to watch long-length media content.

In another example, control circuitry 404 may have data indicating user's current activity as detected in block 1203. In some embodiments, some activities (e.g., taking a long walk, relaxing at home) may be associated with a mood to watch long-length media content. In some embodiments, some activities (e.g., jogging, cooking) may be associate with a mood to watch short-length media content. Consequently, control circuitry 404 may determine that that the user is in the mood to watch long- or short-length media content based on the user's activity.

In some embodiments, control circuitry 404 may determine that that the user is in the mood to watch long- or short-length media content based on the user's watching behavior monitored in block 1205. For example, if the user frequently pauses and re-starts the playback of media content, control circuitry 404 may determine that the user is in the mood to watch short-length media content. In another example, if the user abruptly stops the playback of long-length media content, control circuitry 404 may determine that the user is in the mood to watch short-length media content.

In some embodiments, control circuitry 404 may determine that that the user is in the mood to watch long- or short-length media content based on input received in step 1207. For example, if the user has explicitly selected "long-length mode" via user interface, control circuitry 404 may determine that the user is in the mood to watch long-length media content. In another example, if the user has explicitly selected "short-length mode" via user interface, control circuitry 404 may determine that the user is in the mood to watch short-length media content.

Process 1200 continues to 1210 where control circuitry 404 may proceed to 1212 if the user is in the mood to watch long-length media content. Control circuitry 404 may proceed to 1214 if the user is in the mood to watch short-length media content.

At 1212, control circuitry 404 may activate the long-media viewing profile. In some embodiments, control circuitry 404 may then perform steps 718 and 720 of FIG. 7.

At 1214, control circuitry 404 may activate the short-media viewing profile. In some embodiments, control circuitry 404 may then perform step 724 and 726 of FIG. 7.

Figure 13:
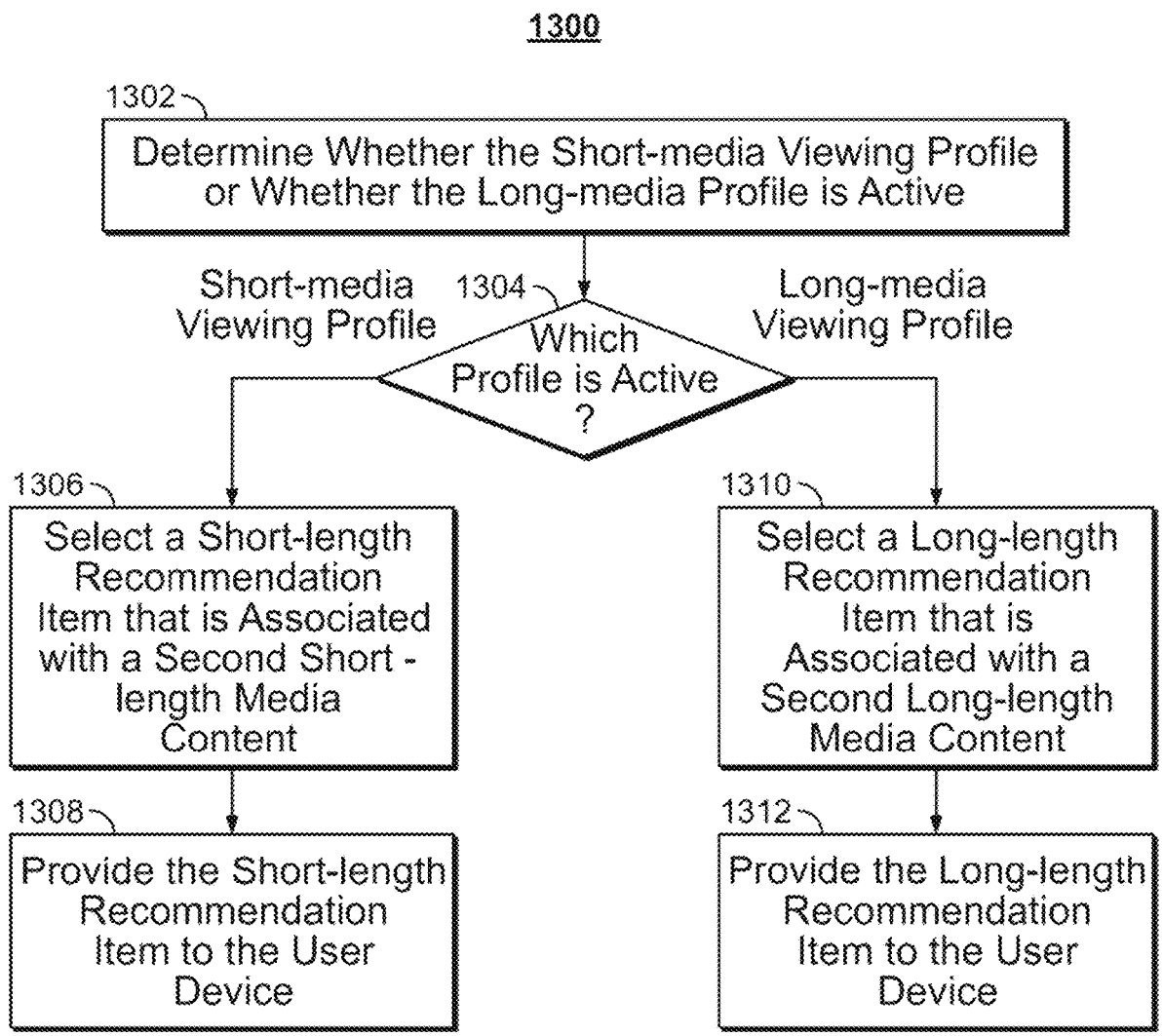
FIG. 13 depicts an illustrative flow diagram for a process of providing the recommendation item to the user device in accordance with some embodiments of the disclosure.

FIG. 13 depicts an illustrative flow diagram of a process 1300 for providing recommendation item to the user device in accordance with some embodiments of the disclosure. Process 1300 may be executed by control circuitry 404, for example, in a manner instructed to control circuitry 404 by the media guidance application. In some embodiments, process 1300 may be performed as part of either blocks 718 or 724. In some embodiments, any of the steps 1302-1312 of FIG. 13 may be optionally omitted. In some embodiments, any of the steps 1302-1312 of FIG. 13 may be performed in any order or simultaneously. In some embodiments, control circuitry 404 may select the recommendation item based on the length of a media item associated with that recommendation item.

Process 1300 begins at 1302 where control circuitry 404 determines which profile is active. For example, the status indicating which profile is active may be maintained in storage 408.

Process 1300 continues at 1304, where control circuitry 404 proceeds to 1306 if the short-media viewing profile is active and to 1310 if the long-media viewing profile is active.

At 1306, control circuitry 404 may select a short-length recommendation item that is associated with second short-length media content. In some embodiments, if the short-media viewing profile is active, control circuitry 404 may only select recommendation items that are associated with short-length media content. That is, control circuitry 404 may only provide recommendation for media content that is shorter than a certain length threshold (e.g., 15 minutes).

At 1308, control circuitry 404 may provide the short-length recommendation item to the user device. This may be done in a manner described in relation to block 720.

At 1310, control circuitry 404 may select a long-length recommendation item that is associated with a second long-length media content. In some embodiments, if the long-media viewing profile is active, control circuitry 404 may only select recommendation items that are associated with long-length media content. That is, control circuitry 404 may only provide recommendation for media content that is longer than certain length threshold (e.g., 15 minutes).

At 1312, control circuitry 404 may provide the long-length recommendation item to the user device. This may be done in a manner described in relation to block 726.

Figure 14:
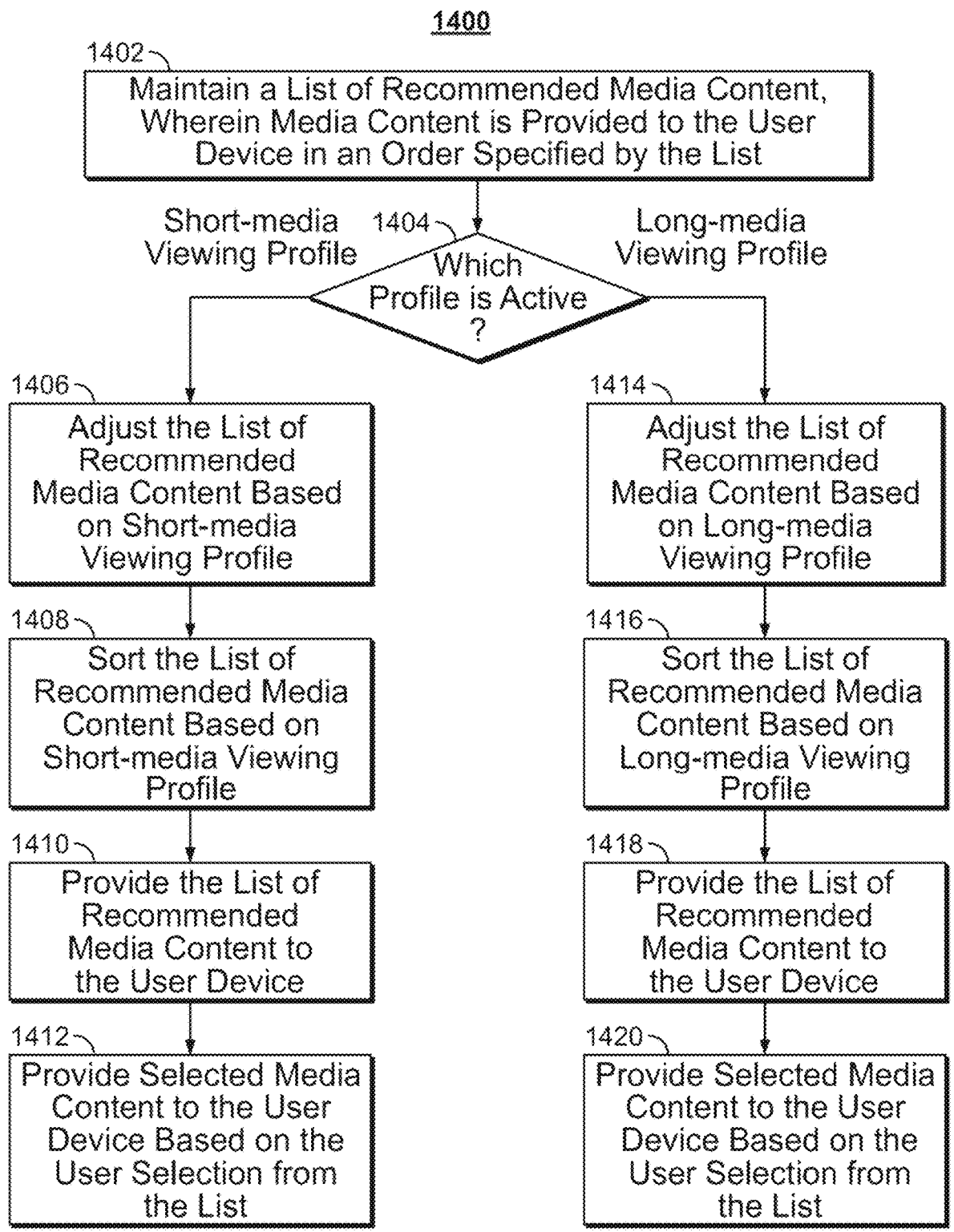
FIG. 14 depicts another illustrative flow diagram for a process of providing recommendations to a user device in accordance with some embodiments of the disclosure.

FIG. 14 depicts an illustrative flow diagram of a process 1400 for providing the recommendation item to the user device in accordance with some embodiments of the disclosure. Process 1400 may be executed by control circuitry 404, for example, in a manner instructed to control circuitry 404 by the media guidance application. In some embodiments, process 1400 may be performed as part of either block 720 or 726. In some embodiments, any of the steps 1402-1420 of FIG. 14 may be optionally omitted. In some embodiments, any of the steps 1402-1420 of FIG. 14 may be performed in any order or simultaneously.

Process 1400 begins at 1402, where control circuitry 404 may maintain a list of recommended media content. For example, the list may include two or more media content items (e.g., the "Thriller" music video followed by the "Beat It" music video). In some embodiments, the list may be ordered, that is, each media content item in the list may be assigned a priority. For example, the music video "Thriller" may be given priority of "1," that is the music video "Thriller" may be first on the list. In another example, the music video "Beat It" may be given a priority of "2," that is the music video "Beat It" may be second on the list. In some embodiments, control circuitry 404 may provide media content to the user device in an order specified by the list. For example, absent different instructions, control circuitry 404 may first provide the first media content on the list (e.g., the music video "Thriller") to the user device, and upon conclusion of that media content, provide the second media content on the list (e.g., the music video "Beat It") to the user device. In another embodiment, once the media content is provided to the user device, it is removed from the playlist. In this case, the first item of the list is always provided to the user device.

Process 1400 continues at 1404, where control circuitry 404 proceeds to 1406 if the short-media viewing profile is active and to 1414 if the long-media viewing profile is active. This determination may be made in a way similar to that described in relation to block 1302.

Process 1400 continues at 1406, where control circuitry 404 may adjust the list of recommended media content based on the short-media viewing profile. For example, control circuitry 404 may add content items to the playlist based on the recommendation metadata contained in the short-media viewing profile. In some embodiments, control circuitry 404 may add content to the list from media content source 516, or media guidance data source 518. In some embodiments, control circuitry 404 may add content to the list from third-party media content sources (e.g., a third-party website like YouTube).

In some embodiments, in addition to matching recommendation metadata in the short-media viewing profile, control circuitry 404 may add content to the list based on other factors. For example, when the short-media viewing profile is active, control circuitry 404 may check for other short-length media that was recently watched or liked by the user's friends, and add that the short-length media to the list. In some embodiments, when the short-media viewing profile is active, control circuitry 404 may identify short-length media content that is of similar type to the currently provided media content. For example, if the user is watching a music video, control circuitry 404 may identify music video short-length media content and add it to the list. In some embodiments, control circuitry 404 may also add at least one long-length media content to the list.

Process 1400 continues at 1408, where control circuitry 404 may sort the list of recommended media content based on the short-media viewing profile. For example, control circuitry 404 may sort the list to present short-length media content higher on the list, while long-length media content may be presented lower on the list. In some embodiments, control circuitry 404 may sort the list based on other factors, e.g., based on popularity of the media content.

Process 1400 continues at 1410, where control circuitry 404 may provide the list of recommended media content to the user device. For example, the list may be provided on display 100 as recommendation 116. In some embodiments, the list is provided while the media content is still being provided. In some embodiments, the list is provided immediately (or shortly) after the current media content concludes.

Process 1400 continues at 1412, where control circuitry 404 may provide selected media content to the user device based on the user selection from the list. For example, the user may select at least one media content item from the list using, e.g. user interface input 410. In some embodiments, control circuitry 404 may then provide the selected media content to the user device after the presentation of the current media content concludes.

Process 1400 may alternatively continue at 1414 after block 1404, where control circuitry 404 may adjust the list of recommended media content based on the long-media viewing profile. For example, control circuitry 404 may add content items to the playlist based on recommendation metadata contained in the long-media viewing profile. In some embodiments, control circuitry 404 may add content to the list from media content source 516, or media guidance data source 518. In some embodiments, control circuitry 404 may add content to the list from third-party media content sources (e.g., a third-party website like YouTube).

In some embodiments, in addition to matching recommendation metadata in the long-media viewing profile, control circuitry 404 may add content to the list based on other factors. For example, when the long-media viewing profile is active, control circuitry 404 may check for other long-length media that was recently watched or liked by the user's friends, and add that long-length media to the list. In some embodiments, when the long-media viewing profile is active, control circuitry 404 may identify long-length media content of similar type to the currently provided media content. For example, if the user is watching a romantic movie, control circuitry 404 may identify other romantic movie long-length media content item and add it to the list. In some embodiments, control circuitry 404 may also add at least one short-length media content item to the list.

Process 1400 continues at 1416, where control circuitry 404 may sort the list of recommended media content based on the long-media viewing profile. For example, control circuitry 404 may sort the list to present long-length media content higher on the list, while short-length media content may be presented lower on the list. In some embodiments, control circuitry 404 may sort the list based on other factors, e.g., based on the user's friends' recommendations or preferences.

Process 1400 continues at 1418, where control circuitry 404 may provide the list of recommended media content to the user device. For example, the list be provided on display 100 as recommendation 116. In some embodiments, the list is provided while the current media content is still being provided. In some embodiments, the list is provided immediately (or shortly after) the current media content concludes.

Process 1400 continues at 1420, where control circuitry 404 may provide selected media content to the user device based on the user selection from the list. For example, the user may select at least media content item from the list using, e.g. recommendation UI 118. In some embodiments, control circuitry 404 may then provide the selected media content to the user device after the presentation of the current media content concludes.

Figure 15:
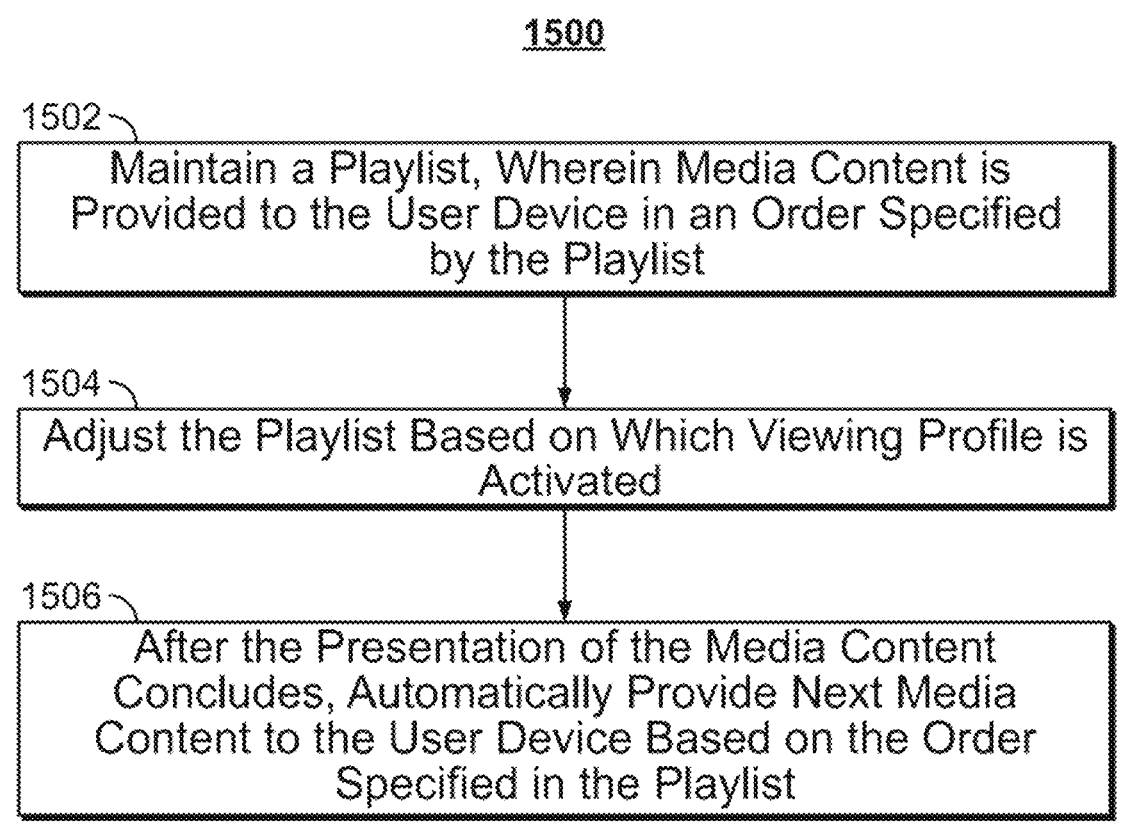
FIG. 15 depicts yet another illustrative flow diagram for a process of providing recommendations to a user device in accordance with some embodiments of the disclosure.

FIG. 15 depicts an illustrative flow diagram of a process 1500 for providing the recommendation item to the user device in accordance with some embodiments of the disclosure. Process 1500 may be executed by control circuitry 404, for example, in a manner instructed to control circuitry 404 by the media guidance application. In some embodiments, process 1400 may be performed as part of either block 720 or 726. In some embodiments, any of the steps 1502-1506 of FIG. 15 may be optionally omitted. In some embodiments, any of the steps 1502-1506 of FIG. 15 may be performed in any order or simultaneously. In some embodiments, in the context of process 1500, the recommendation item may comprise media content.

Process 1500 begins at 1502, where control circuitry 404 maintains a playlist. The playlist may comprise an ordered data structure of recommendation items (e.g., recommendation media content items). In some embodiments, the playlist may include a plurality of movies or other video. For example, the playlist may include the movie "Titanic" and the music video "Thriller." For example, the movie "Titanic" may be given priority of "1." In another example, the music video "Thriller" may be given a priority of "2." In some embodiments, control circuitry 404 may provide media content to the user device in an order specified by the list. For example, absent different instructions, control circuitry 404 may automatically provide the first media content on the list (e.g., the movie "Titanic") to the user device, and upon conclusion of that media content, automatically provide the second media content item on the list (e.g., the music video "Thriller") to the user device. In some embodiments, any number of media content items of both long-length and short-length may be included in the playlist.

Process 1500 continues at 1504, where control circuitry 404 adjusts the playlist based on which viewing profile is activated. In some embodiments, the long-media viewing profile may have been activated (e.g., in block 716). In some embodiments, the short-media viewing profile may have been activated (e.g., in block 722).

In some embodiments, if the short-media viewing profile is activated, control circuitry 404 may add one or more short-length media content items to the playlist. In some embodiments, additionally, or alternatively, control circuitry 404 may sort the playlist such that the short-length media content items are assigned higher priority than long-length media content items. For example, the playlist may be modified such that the music video "Thriller" (short-length media content) is given higher priority on the playlist than the movie "Titanic" (long-length media content).

In some embodiments, if the long-media viewing profile is activated, control circuitry 404 may add one or more long-length media content item to the playlist. In some embodiments, additionally, or alternatively, control circuitry 404 may sort the playlist such that long-length media content items are assigned higher priority than short-length media content items. For example, the playlist may be modified such that the movie "Titanic" (long-length media content) is given higher priority on the playlist than the music video "Thriller" (short-length media content).

Process 1500 continues at 1506, where control circuitry 404 automatically provides the next media content to the user device based on the order specified in the playlist. In some embodiments, the playlist may be provided for display to the user, e.g. as recommendation 116 on display 100. In some embodiments, the playlist may be invisible to the user, and maintained internally by control circuitry 404.

In some embodiments, control circuitry 404 may automatically provide the media content item with the highest priority as next media content to the user, after the presentation of the current media content (e.g., media content provided at step 710) concludes. In some embodiments, control circuitry 404 may automatically provide the next media content to the user device without any kind of user input. For example, once the presentation of the current media content concludes, control circuitry 404 may begin providing the movie "Titanic" (first item in the plays-list) to the user device without receiving any kind of user input or confirmation.

It should be noted that processes 600-1500, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, and 506 (FIG. 5). In addition, one or more steps of processes 600 and 700 may be incorporated into, or combined with, one or more steps of any other process or embodiment.

It is contemplated that the steps or descriptions of each of FIGS. 6-15 may be used with any other embodiment of this disclosure. It is contemplated that some steps or descriptions of each of FIGS. 6-15 may be optional and may be omitted in some embodiments. In addition, the steps and descriptions described in relation to FIGS. 6-15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-15.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518.

The processes discussed above in FIGS. 6-15 are intended to be illustrative and not limiting. One skilled in the art would appreciate that the steps of the processes in FIGS. 6-15 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
    retrieving a first plurality of identifiers for a first plurality of recommended long-length content items selected based on a first user profile, wherein the first user profile is generated based at least in part on user interface input during a consumption of long-length content;
    retrieving a second plurality of identifiers for a second plurality of recommended short-length content items selected based on a second user profile, wherein the second user profile is generated based at least in part on user interface input during a consumption of short-length content; and
    generating for display a user interface comprising:
        (a) a first portion for display of the first plurality of identifiers for the first plurality of recommended long-length content items selected based on the first user profile; and
        (b) a second portion for display of the second plurality of identifiers for the second plurality of recommended short-length content items selected based on the second user profile.

2. The method of claim 1, wherein the short-length content items comprise a video clip.

3. The method of claim 1, wherein the long-length content items comprise one or more of a sports game, a full-feature movie, or a TV series episode.

4. The method of claim 1, wherein the second plurality of identifiers for the second plurality of recommended short-length content items is selected based on the second user profile and popularity data of the short-length content items.

5. The method of claim 1, wherein the first portion and the second portion are displayed simultaneously.

6. The method of claim 1, wherein the first portion and the second portion are not displayed simultaneously.

7. A system comprising:
    processing circuitry configured to:
        retrieve a first plurality of identifiers for a first plurality of recommended long-length content items selected based on a first user profile, wherein the first user profile is generated based at least in part on user interface input during a consumption of long-length content;
        retrieve a second plurality of identifiers for a second plurality of recommended short-length content items selected based on a second user profile, wherein the second user profile is generated based at least in part on user interface input during a consumption of short-length content; and
    display circuitry configured to:
        generate for display a user interface comprising:
            (a) a first portion for display of the first plurality of identifiers for the first plurality of recommended long-length content items selected based on the first user profile; and
            (b) a second portion for display of the second plurality of identifiers for the second plurality of recommended short-length content items selected based on the second user profile.

8. The system of claim 7, wherein the short-length content items comprise a video clip.

9. The system of claim 7, wherein the long-length content items comprise one or more of a sports game, a full-feature movie, or a TV series episode.

10. The system of claim 7, wherein the second plurality of identifiers for the second plurality of recommended short-length content items is selected based on the second user profile and popularity data of the short-length content items.

11. The system of claim 7, wherein the first portion and the second portion are displayed simultaneously.

12. The system of claim 7, wherein the first portion and the second portion are not displayed simultaneously.

13. A non-transitory computer readable medium comprising:
   instructions that when executed by processing circuitry cause the processing circuitry to:
      retrieve a first plurality of identifiers for a first plurality of recommended long-length content items selected based on a first user profile, wherein the first user profile is generated based at least in part on user interface input during a consumption of long-length content;
      retrieve a second plurality of identifiers for a second plurality of recommended short-length content items selected based on a second user profile, wherein the second user profile is generated based at least in part on user interface input during a consumption of short-length content; and
   instructions that when executed by display circuitry cause the display circuitry to:
      generate for display a user interface comprising:
         (a) a first portion for display of the first plurality of identifiers for the first plurality of recommended long-length content items selected based on the first user profile; and
         (b) a second portion for display of the second plurality of identifiers for the second plurality of recommended short-length content items selected based on the second user profile.

14. The non-transitory computer readable medium of claim 13, wherein the short-length content items comprise a video clip.

15. The non-transitory computer readable medium of claim 13, wherein the long-length content items comprise one or more of a sports game, a full-feature movie, or a TV series episode.

16. The non-transitory computer readable medium of claim 13, wherein the second plurality of identifiers for the second plurality of recommended short-length content items is selected based on the second user profile and popularity data of the short-length content items.

17. The non-transitory computer readable medium of claim 13, wherein the first portion and the second portion are displayed simultaneously.

18. The non-transitory computer readable medium of claim 13, wherein the first portion and the second portion are not displayed simultaneously.

* * * * *